US012732879B2

(12) United States Patent
Nishant et al.

(10) Patent No.: US 12,732,879 B2
(45) Date of Patent: Sep. 8, 2026

(54) METHOD AND APPARATUS FOR SELECTING NON-TERRESTRIAL NETWORK CELL

(71) Applicant: Samsung Electronics Co., Ltd., Suwon-si (KR)

(72) Inventors: Nishant, Bangalore (IN); Siddharth Shukla, Bangalore (IN); Amit Anandrao Dange, Bangalore (IN); Vivek Murugaiyan, Bangalore (IN); Kailash Kumar Jha, Bangalore (IN); Mohammad Umair, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 216 days.

(21) Appl. No.: 18/541,944

(22) Filed: Dec. 15, 2023

(65) Prior Publication Data

US 2024/0292299 A1 Aug. 29, 2024

Related U.S. Application Data

(63) Continuation of application No. PCT/KR2023/020317, filed on Dec. 11, 2023.

(30) Foreign Application Priority Data

Feb. 23, 2023 (IN) ............................ 202341012433
Nov. 6, 2023 (IN) ............................ 2023 41012433

(51) Int. Cl.

| | |
|---|---|
| ***H04W 36/08*** | (2009.01) |
| ***H04W 36/00*** | (2009.01) |
| ***H04W 36/36*** | (2009.01) |

(52) U.S. Cl.

CPC ..... *H04W 36/083* (2023.05); *H04W 36/0061* (2013.01); *H04W 36/362* (2023.05)

(58) Field of Classification Search

CPC ........... H04W 36/083; H04W 36/0061; H04W 36/00837; H04W 36/32; H04W 36/324; H04W 36/362; H04W 48/20; H04W 84/06

(Continued)

(56) References Cited

U.S. PATENT DOCUMENTS 12,445,924 B2 * 10/2025 Lauridsen .......... H04B 7/18541
2022/0191752 A1 6/2022 Rune et al.

(Continued)

FOREIGN PATENT DOCUMENTS

KR 10-2020-0071004 A 6/2020
WO 2021/180154 A1 9/2021

(Continued)

OTHER PUBLICATIONS

ZTE Corporation et al., Cell reselection enhancements for NTN-NTN, R2-2301142, 3GPP TSGRAN WG2 Meeting#121, Athens, Greece, Feb. 17, 2023.

(Continued)

*Primary Examiner* — Hirdepal Singh
(74) *Attorney, Agent, or Firm* — Jefferson IP Law, LLP

(57) ABSTRACT

A method for selecting a non-terrestrial network (NTN) cell by a user equipment (UE) is provided. The method includes receiving one or more system parameters from a serving NTN cell and a plurality of NTN neighbor cells, determining trajectory information associated with the plurality of NTN neighbor cells based on the one or more received system parameters, and selecting the NTN cell among the plurality of NTN neighbor cells to perform at least one of a cell reselection and a conditional hand over (CHO) based on the determined trajectory information associated with the plurality of NTN neighbor cells.

20 Claims, 17 Drawing Sheets

(58) Field of Classification Search
USPC .......................................................... 455/437
See application file for complete search history.

(56) References Cited

U.S. PATENT DOCUMENTS

| | | | | |
|---|---|---|---|---|
| 2022/0232491 | A1 | 7/2022 | Ma et al. | |
| 2023/0030149 | A1 | 2/2023 | Hou et al. | |
| 2023/0344508 | A1* | 10/2023 | Tseng | H04W 56/0045 |
| 2023/0345338 | A1 | 10/2023 | Luo et al. | |
| 2024/0064586 | A1* | 2/2024 | Chen | H04B 7/18541 |
| 2024/0120992 | A1 | 4/2024 | Li | |
| 2024/0146406 | A1* | 5/2024 | Suh | H04W 36/00837 |

FOREIGN PATENT DOCUMENTS

| | | | | |
|---|---|---|---|---|
| WO | 2021/189359 | A1 | 9/2021 | |
| WO | 2022/038510 | A1 | 2/2022 | |
| WO | 2022/038513 | A1 | 2/2022 | |
| WO | 2022/082632 | A1 | 4/2022 | |
| WO | 2022/134065 | A1 | 6/2022 | |
| WO | 2022/143564 | A1 | 7/2022 | |
| WO | 2022/151186 | A1 | 7/2022 | |
| WO | 2022/235016 | A1 | 11/2022 | |
| WO | WO-2023282673 | A1 * | 1/2023 | H04W 36/32 |
| WO | WO-2024170749 | A1 * | 8/2024 | H04W 48/02 |

OTHER PUBLICATIONS

Intel Corporation, Discussion on NTN-NTN cell reselection enhancements, R2-2300362, 3GPP TSG-RAN WG2 Meeting #121, Athens, Greece, Feb. 17, 2023.
CMCC, Discussion on NTN-NTN reselection, R2-2301226, 3GPP TSG RAN WG2#121, Athens, Feb. 17, 2023.
International Search Report dated Mar. 22, 2024, issued in International Application No. PCT/KR2023/020317.
5G; NR; Radio Resource Control (RRC); Protocol specification (3GPP TS 38.331 version 17.0.0 Release 17), ETSI TS 138 331 V17.0.0, May 1, 2022.
5G; NR; User Equipment (UE) procedures in idle mode and in RRC Inactive state (3GPP TS 38.304 version 17.0.0 Release 17), ETSI TS 138 304 V17.0.0, May 1, 2022.
CATT, Discussion on NTN Mobility Enhancements, R2-2209408, 3GPP TSG-RAN WG2 Meeting #119bis-e, XP052262739, Sep. 30, 2022.
Intel Corporation, Report of [AT119bis-e][117][NR NTN Enh] cell reselection, R2-2210860, 3GPP TSG-RAN WG2 Meeting #119bis-e, XP052264154, Oct. 21, 2022.
European Search Report dated Oct. 14, 2025, issued in European Application No. 23924349.6.
Indian Office Action dated Jun. 30, 2026, issued in Indian Patent Application No. 202341012433.

* cited by examiner

FIG. 12

METHOD AND APPARATUS FOR SELECTING NON-TERRESTRIAL NETWORK CELL

CROSS-REFERENCE TO RELATED APPLICATION(S)

This application is a continuation application, claiming priority under § 365(c), of an International application No. PCT/KR2023/020317, filed on Dec. 11, 2023, which is based on and claims the benefit of an Indian Provisional patent application No. 202341012433, filed on Feb. 23, 2023, in the Indian Intellectual Property Office, and of an Indian Complete patent application Ser. No. 202341012433, filed on Nov. 6, 2023, in the Indian Intellectual Property Office, the disclosure of each of which is incorporated by reference herein in its entirety.

TECHNICAL FIELD

The disclosure relates to the field of non-terrestrial network (NTN). More particularly, the disclosure relates to a method and an apparatus for selecting an NTN cell for a user equipment.

BACKGROUND

Non-terrestrial network (NTN) is a communication network that operates in space or on celestial bodies, such as satellites and is an essential component of contemporary telecommunications infrastructure (e.g., fifth generation (5G) wireless communication system).

FIG. 1 illustrates a NTN according to the related art.

Referring to FIG. 1, the NTN 10 may include satellite communication network (in various orbits with different types of deployments like earth fixed cell or earth moving cell), high altitude platform systems (HAPS), unmanned aircraft system (UAS), and air-to-ground networks. These networks are critical in providing global connectivity to a user equipment (UE), especially in remote areas. In the NTN 10, the UE may determine a time during which the UE remains in a satellite communication network coverage area based on a UE speed, an NTN direction, a UE movement (i.e., same, or opposite directions of satellite movement), and a cell size (which is determined by satellite beam width: larger beam widths yield larger cell size). The UE inside this area may need to perform a cell reselection and a conditional handover (CHO) when transitioning between unique satellite cells or ground-based cellular cells connected to satellite communication networks. This provides continuous communication and efficient use of network resources in the NTN 10.

Integration of the NTN 10 began in Release 15 (TR 38.811) of 3rd generation partnership project (3GPP), the 3GPP conducted a study to investigate channel types and deployment scenarios. In release-16 (TR 38.821) of the 3GPP, the 3GPP initiated a study to develop solutions for adapting 5G new radio (NR) to support the NTN 10. The NTN 10 may include deploying elements of network infrastructure overhead through satellites, high altitude platform station (HAPS), or drones (unmanned aircraft systems). This has various advantages, including increasing coverage to places with no terrestrial access, providing vital communications, and improving network dependability and resilience.

In release-17 of the 3GPP, the 3GPP shifted a focus towards standalone deployment and utilizes a transparent bent-pipe satellite architecture. This approach assumes that the UE has global navigation satellite system (GNSS) or similar capabilities, although not necessarily simultaneous operation, to pre-compensate for time and frequency synchronization. As the NTN 10 continues developing, two distinct directions have formed. First, there is a drive for 5G NR upgrades to include non-terrestrial communications into a 5G infrastructure. Second, there is an emphasis on expanding an internet of things (IoT) or massive machine-type communications (mMTC) via non-terrestrial connectivity. Additionally, in the release-17, the 3GPP introduced NTN-specific system information, which may contain satellite assistance information for NTN access. For example, system information block (SIB)-19 is a mandatory SIB to camp on an NTN cell. The UE may receive multiple information related to satellites in the SIB-19, as shown in Table 1 and Table 2 below.

TABLE 1

```
SIB19-r17 ::= SEQUENCE {
  non-config-r17                     NTN-config-r17                 OPTIONAL,  -- Need R
  t-Service-r17                      INTEGER (0..549755813887)      OPTIONAL,  -- Need R
  referenceLocation-r17              ReferenceLocation-r17          OPTIONAL,  -- Need R
  distanceThresh-r17                 INTEGER (0..65525)             OPTIONAL,  -- Need R
  non-NeighCellConfigList-r17        NTN-NeighCellConfigList-r17    OPTIONAL,  -- Need R
  lateNonCritcalExtension            OCTET STRING                   OPTIONAL,
  ...,
  [[
  non-NeighCellConfigListExt-v1720   NTN-NeighCellConfigList-r17    OPTIONAL   -- Need R
  ]]
}
NTN-NeighCellConfigList-r17 ::=   SEQUENCE (SIZE(1..maxCellNTN-r17)) OF NTN-NeighCellConfig-r17
NTN-NeighCellConfig-r17 ::=       SEQUENCE {
  ntn-Config-r17                     NTN-Config-r17       OPTIONAL,  -- Need R
  CarrierFreq-r17                    ARFCN-ValueNR        OPTIONAL,  -- Need R
  PhysCellId-r17                     PhysCellId           OPTIONAL,  -- Need R
}
```

TABLE 2

| SIB19 field descriptions |
|---|
| distanceThresh<br>Distance from a serving cell reference location and is used in location-based measurement initiation in radio resource control (RRC)_IDLE and RRC_INACTIVE mode. Each step represents 50 m. |
| ntn-Config<br>Provides parameters needed for the UE to access NR via NTN access, such as Ephemeris data, common TA parameters, k_offset, validity duration for UL sync information, and epoch. |
| ntn-NeighCellConfigList, ntn-NeighCellConfigListExt<br>Provides a list of NTN neighbour cells including their ntn-Config, carrier frequency, and PhysCellId. This set includes all elements of ntn-NeighCellConfigList and all elements of ntn-NeighCellConfigListExt. If ntn-Config is absent for an entry in ntn-NeighCellConfigListExt, the ntn-Config provided in the entry at the same position in ntn-NeighCellConfigList applies. |
| referenceLocation<br>The reference location of the serving cell is provided via NTN quasi-Earth fixed system and is used in location-based measurement initiation in RRC_IDLE and RRC_INACTIVE mode. |
| t-Service<br>Indicates the time information on when a cell provided via NTN quasi-Earth fixed system is going to stop serving the area it is currently covering. The field indicates a time in multiples of 10 ms after 00:00:00 on Gregorian calendar date 1 Jan., 1900 (midnight between Sunday, Dec. 31, 1899, and Monday, Jan. 1, 1900). The exact stop time is between the time indicated by the value of this field minus 1 and the time indicated by the value of this field. |

In the SIB-19, information element (IE) NTN-Config provides parameters needed for the UE to access NR via the NTN access, as shown in Table 3 below. Further, IE EphemerisInfo in the NTN-Config provides satellite ephemeris. Ephemeris may be expressed either in the format of position and velocity state vector in earth-centered earth-fixed (ECEF) or in the format of orbital parameters in earth-centered inertial (ECI), as shown in Table 4 below.

TABLE 3

```
NTN-Config-r17 ::=          SEQUENCE {
  epochTime-r17                  EpochTime-r17                  OPTIONAL,  -- Need R
  non-UlSyncValidityDuration-r17 ENUMERATED { s5, 10, s15, s20, s30, s35,
    s40, s45, s50, s55, s60, s120, s180, s240, s900}            OPTIONAL,  -- Cond SIB19
  cellSpecificKoffset            INTEGER (1..1023)              OPTIONAL,  -- Need R
  kmac-r17                       INTEGER (1..512)               OPTIONAL,  -- Need R
  ta-Info-r17                    TA-Info-r17                    OPTIONAL,  -- Need R
  ntn-PolarizationDL-r17         ENUMERATED {rhcp, lhcp, linear} OPTIONAL,  -- Need R
  ntn=PolarizationUL-r17         ENUMERATED {rhcp, lhcp, linear} OPTIONAL,  -- Need R
  ephemerisInfo-r17              EphemerisInfo-r17              OPTIONAL,  -- Need R
  ta-Report-r17                  ENUMERATED {enabled}           OPTIONAL,  -- Need R
  ...,
}
EpochTime-r17 ::=           SEQUENCE {
  sfn-r17                        INTEGER (0..1023),
  subFrameNR-r17                 INTEGER (0..9)
}
TA-Info-r17 ::=             SEQUENCE {
  ta-Common-r17                  INTEGER (0..66485757),
  ta-CommonDrift-r17             INTEGER (−257303..257303)      OPTIONAL,  -- Need R
  ta-CommonDriftVariant-r17      INTEGER (0..28949)             OPTIONAL,  -- Need R
}
```

TABLE 4

```
EphemerisInfo-r17 ::=       CHOICE {
  positionVelocity-r17           Position Velocity-r17,
  orbital-r17                    Orbital-r17
}
PositionVelocity-r17 ::=    SEQUENCE {
  positionX-r17                  PositionStateVector-r17,
  positionY-r17                  PositionStateVector-r17,
  positionZ-r17                  PositionStateVector-r17,
  velocityVX-r17                 VelocityStateVector-r17,
  velocityVY-r17                 VelocityStateVector-r17,
  velocityVZ-r17                 VelocityStateVector-r17,
}
Orbital-r17 ::=             SEQUENCE {
  semiMajorAxis-r17              INTEGER (0..8589934591),
  eccentricity-r17               INTEGER (0..1048575),
  periaspsis-r17                 INTEGER (0..268435455),
  longitude-r17                  INTEGER (0..268435455),
  inclination-r17                INTEGER (−67108864..67108863),
  mean Anomaly-r17               INTEGER (0..268435455)
}
PositionStateVectro-r17 ::= INTEGER (−33554432..33554431)
VelocityStateVector-r17 ::= INTEGER (−131072..131071)
```

Upon receiving the SIB19, the UE in an RRC_CONNECTED mode may start or restart a T430 timer for the serving cell with the timer value set to an ntn-UISyncValidityDuration from a subframe indicated by an epochTime. The exact time when a UL synchronization is obtained (after SIB19 is acquired) is left to UE implementation. If the T430 timer for the serving cell expires in the RRC_CONNECTED mode then the UL synchronization is lost and the SIB19 has to be reacquired. Ideally, the UE may attempt to re-acquire the SIB19 before end of the duration indicated by the ntn-UISyncValidityDuration and the epochTime, as mentioned in Table 5 below.

TABLE 5

| NTN-Config relevant field descriptions |
|---|
| EphemerisInfo<br>This field provides satellite ephemeris either in format of position and velocity state vector or in format of orbital parameters.<br>epochTime<br>Indicate the epoch time for the NTN assistance information. When explicitly provided through SIB, or through dedicated signalling, the EpochTime is the starting time of a DL sub-frame, indicated by an SFN and a sub-frame number signalled together with the assistance information. For serving cell, the field SFN indicates the current SFN or the next upcoming SFN after the frame where the message indicating the epochTime is received. For neighbour cell, the SFN indicates the SFN nearest to the frame where the message indicating the epochTime is received. If this field is absent in ntn-Config provided via NTN-NeighCellConfig the UE uses the epoch time of the serving cell, otherwise, the field is based on the timing of the serving cell, i.e., the SFN and sub-frame number indicated in this field refers to the SFN and sub-frame of the serving cell. In case of handover or conditional handover, this field is based on the timing of a target cell, i.e., the SFN and sub-frame number indicated in this field refers to the SFN and sub-frame of the target cell. For the target cell, the UE considers epoch time, indicated by the SFN and sub-frame number in this field, to be the frame nearest to the frame in which the message indicating the epoch time is received.<br>ntn-UlSyncValidityDuration<br>A validity duration configured by the network for assistance information (i.e., Serving and/or neighbour satellite ephemeris and Common TA parameters) which indicates the maximum time duration (from the epochTime) during which the UE can apply assistance information without having acquired new assistance information.<br>The unit of ntn-UlSyncValidityDuration is second. This parameter applies to both connected and idle mode UEs. If this field is absent in ntn-Config provided via NTN-NeighCellConfig, the UE uses validity duration from the serving cell assistance information. ntn-UlSyncValidityDuration is only updated when at least one of epochTime, ta-Info, and ephemerisInfo is updated. |

For the cell reselection, according to 3GPP TS 38.304 v17.3.0, section 5.2.4.2, as shown in Table 6 below, the UE may perform an intra-frequency, an inter-frequency, or an inter-radio access technology (RAT) measurement(s) before a t-service timer expiry, regardless of the distance between the UE and the serving cell reference location or whether the serving cell fulfills the cell reselection evaluation criteria, as shown in Table 7 and Table 8 below.

TABLE 6

| |
|---|
| If the t-Service of the serving cell is present in SIB19, UE should start to perform intra-frequency, inter-frequency, or inter-RAT measurements before the t-Service, regardless of the distance between UE and the serving cell reference location or whether the serving cell fulfils Srxlev > SIntraSearchP and Squal > SIntraSearchQ, or Srxlev > SnonIntraSearchP and Squal > SnonIntraSearchQ and the exact time to start measurement before t-Service is up to UE implementation.<br>UE shall perform measurements of higher priority NR inter-frequency or inter-RAT frequencies according to TS 38.133 [8] regardless of the remaining service time of the serving cell. |

NOTE:
When evaluating the distance between UE and the serving cell reference location, it's up to UE implementation to have available UE location information

TABLE 7

| |
|---|
| As per 3GPP TS 38.304 v17.3.0, Section 5.2.4.2, UE may perform NR intra-frequency measurements as follows.<br>If the serving cell fulfils Srxlev > SIntraSearchP and Squal > SIntraSearchQ:<br>If distanceThresh is broadcasted in SIB-19, and if UE supports location-based measurement initiation and has valid UE location information: |

TABLE 7-continued

| |
|---|
| If the distance between UE and the serving cell reference location is shorter than distanceThresh, the UE may choose not to perform intra-frequency measurements;<br>Otherwise, the UE shall perform intra-frequency measurements;<br>Otherwise, the UE may choose not to perform intra-frequency measurements;<br>Otherwise, the UE shall perform intra-frequency measurements. |

TABLE 8

| As per 3GPP TS 38.304 v17.3.0, Section 5.2.4.2, UE may perform NR inter-frequency cell measurements as follows |
|---|
| If the serving cell fulfils Srxlev > SnonIntraSearchP and Squal > SnonIntraSearchQ:<br>If distanceThresh is broadcasted in SIBxx, and if UE supports location-based measurement initiation and has valid UE location information:<br>If the distance between UE and the serving cell reference location is shorter than distanceThresh, the UE may choose not to perform measurements of NR inter-frequency cells of equal or lower priority, or inter-RAT frequency cells of lower priority;<br>Otherwise, the UE shall perform measurements of NR inter-frequency cells of equal or lower priority, or inter-RAT frequency cells of lower priority according to TS 38.133 [8]; |

TABLE 8-continued

| As per 3GPP TS 38.304 v17.3.0, Section 5.2.4.2, UE may perform NR inter-frequency cell measurements as follows |
|---|
| Otherwise, the UE may choose not to perform measurements of NR inter-frequency cells of equal or lower priority, or inter-RAT frequency cells of lower priority; |
| Otherwise, the UE shall perform measurements of NR inter-frequency cells of equal or lower priority, or inter-RAT frequency cells of lower priority according to TS 38.133 [8]. |

When the UE goes to an idle or inactive mode, the UE has information about different frequencies and their priorities. The UE utilizes this information to reselect to a different cell based on the priority and signal conditions of the target cell. The UE may only perform cell reselection evaluation for NR frequencies and inter-RAT frequencies that are given in system information (e.g., SIB-19) and for which the UE has a priority provided as per the reselection criteria defined in 3GPP TS 38.304 and select a suitable cell to complete the reselection process, as illustrated in FIGS. 2 and 3.

FIG. 2 is a flow diagram illustrating a method 20 for a cell reselection according to the related art.

Referring to FIG. 2, at operation 21, the method 20 includes detecting that the UE is in a serving NTN cell with the idle mode with frequencies and priorities configured to re-select. At operation 22, the method 20 includes measuring, by the UE, neighbor inter/intra NR cell frequencies based on 3GPP criteria (signal strength/t-service/distance threshold) to switch from a current serving cell (e.g., serving NTN cell). At operation 23, the method 20 includes determining whether a suitable target cell is available to re-select as per 3GPP criteria. The method 20 includes performing above-mentioned operations in response to determining that the suitable target cell is not available to re-select as per the 3GPP criteria. At operation 24, the method 20 includes performing, by the UE, the cell reselection to the suitable target cell based on best signal criteria in response to determining that the suitable target cell is available to re-select as per the 3GPP criteria.

The existing cell reselection method (i.e., method 20) includes one or more preconditions, which are given below.

Candidate NTN cell frequencies are available to the UE via the system information block.

The UE has set a priority as per cell re-selection criteria defined in 3GPP TS 38.304.

In the existing cell reselection method, when the UE is attached to the serving NTN cell, the UE may only perform cell reselection evaluation for NR frequencies and inter-RAT frequencies that are given in the system information block and for which the UE has a priority provided as per the reselection criteria defined in 3GPP TS 38.304 and the UE selects the suitable target cell to complete the reselection process (cell reselection). Additionally, the UE performs the cell reselection before the t-service timer expiration of the serving NTN cell to avoid any cell loss and ensure NTN service continuity. However, the existing cell reselection method has a few drawbacks, which are listed below.

The UE performs the cell reselection based on signal strength or t-service length or distance threshold criteria, but this will not necessarily ensure the best cell which will provide longer service duration in the suitable target cell, as illustrated in FIGS. 3 and 7.

Existing 3GPP standards do not mention any specific methodology to follow or any special condition to satisfy in order to select the best cell (suitable target cell) among the candidate NTN cells to perform the cell reselection before the t-service timer expiration.

It is possible that UE may reselect to a neighboring cell (e.g., suitable target cell) with lesser service time or unfavorable trajectory with respect to the UE, as illustrated in FIGS. 3 and 7, which may lead to the higher frequency of neighbor cell measurements causing more UE power consumption, which is not desirable.

FIG. 3 is a sequence flow diagram illustrating a method 30 for a cell reselection according to the related art.

Referring to FIG. 3, at operation 31, the method 30 includes the receiving, by the UE, the SIB-19 from the serving NTN cell (serving NTN cell-A). At operation 32, the method 30 includes detecting that UE is in the RRC idle mode and pre-configured for cell-reselection. Additionally, the UE initiates the t-service timer associated with the serving NTN cell-A. At operation 33, the method 30 includes measuring, by the UE, the neighbor inter/intra NR cell frequencies based on the 3GPP criteria. At operation 34, the method 30 includes detecting, by the UE, based on the measuring, two neighbor candidate cells (e.g., neighbor NTN cell-B and neighbor NTN cell-C), where cell-B trajectory is not aligned with UE path, in other words, less t-service time, and cell-C trajectory is aligned with the UE path.

At operations 35, 36, and 37, the method 30 includes reselecting, by the UE, the cell-B by sending a cell-reselection request before expiration of the t-service timer associated with the serving NTN cell-A, where the UE gets a lesser duration of service, based on the existing cell reselection method. At operations 38 and 39, the method 30 includes receiving, upon sending the cell-reselection request, the SIB-19 from the neighbor NTN cell-B and initiating, upon receiving the SIB-19, a t-service timer associated with the serving NTN cell-B. As a result, in the existing cell reselection method, the UE reselects the neighbor NTN cell-B with lesser service time or unfavorable trajectory with respect to the UE, which may lead to the higher frequency of neighbor cell measurements causing more UE power consumption, which is not desirable.

For the CHO, a source node (e.g., serving NTN cell) configures the one or more candidate target secondary group primary cell (SpCells) (e.g., suitable target cell/target node) in the conditional reconfiguration which contains information to perform a handover for respective candidate cells (e.g., suitable target cell/target node), as illustrated in FIGS. 4, 5, 6, and 7, along with associated one or more conditions that may be monitored similar to measurement information. The UE evaluates the one or more conditions of each configured candidate target SpCell and the UE applies the conditional configuration associated with one of the candidate target SpCells once the associated execution condition is fulfilled. The source node further configures a handover command (e.g., CHO configuration) when one or more radio conditions are still favorable which reduces a risk of failing a transmission of a measurement report and/or a reception of the handover command during a legacy handover. The conditional configuration information present in the UE may also be used during the cell selection for RRC connection reestablishment in instances of a radio link failure or reconfiguration with sync failure.

FIG. 4 is a flow diagram illustrating a method 40 for a CHO according to the related art.

Referring to FIG. 4, at operation 41, the method 40 includes sending, by the source node, a CHO request to the target node. At operation 42, the method 40 includes receiving, by the source node, an acknowledgement associated with the CHO request along with the RRC reconfiguration. At operation 43, the method 40 includes sending, by the source node, upon receiving the RRC reconfiguration, CHO configuration to the UE. At operations 44 and 45, the method 40 includes monitoring, by the UE, the CHO condition for the target node and executing the CHO when the one or more radio conditions are fulfilled. At operation 46, the method 40 includes sending, by the UE, upon detecting that the one or more radio conditions are fulfilled, a CHO confirmation to the target node. At operation 47, the method 40 includes performing, by the target node, a path switch operation and releasing UE context.

For the CHO, according to 3GPP TS 38.300 v17.6.0, Section 16.14.3.2.2, some additional NTN-based trigger conditions have been specified whose evaluation has been left up to UE implementation, as shown in Table 9 below.

TABLE 9

| 16.14.3.2.2 Conditional Handover |
|---|
| The same principle as described in 9.2.3.4 applies to NTN unless hereunder specified.<br>NTN supports the following additional trigger conditions upon which UE may execute CHO to a candidate cell, as defined in TS 38.331 [12]:<br>The RRM measurement-based event A4;<br>A time-based trigger condition;<br>A location-based trigger condition.<br>A time-based or a location-based trigger condition is always configured together with one of the measurement-based trigger conditions (CHO events A3/A4/A5) as defined in TS 38.331 [12].<br>It is up to UE implementation how the UE evaluates the time- or location-based trigger condition together with the RRM measurement-based event. |

Additionally, for the CHO, according to 3GPP TS 38.331 v17.3.0, Section 6.3.2, CHO configuration and execution condition, IE's have been specified, as shown in Table 10 and Table 11 below.

FIG. 5 is a flow diagram illustrating another method 50 for a CHO according to the related art.

Referring to FIG. 5, at operation 51, the method 50 includes detecting that the UE is in NTN cell connected mode and conditional handover configured with suitable candidate cell list (e.g., suitable target cell/target node/candidate NTN cell). At operation 52, the method 50 includes performing, by the UE, measurement of the candidate cells. At operation 53, the method 50 includes determining whether the suitable candidate cells are available for CHO execution. The method 50 includes performing above-mentioned operations in response to determining that the suitable candidate cells are not available for the CHO execution. At operation 54, the method 50 includes performing the CHO execution based on best reference signal received power (RSRP)/reference signal received quality (RSRQ)/signal to interference plus noise ratio (SINR) in response to determining that the suitable candidate cells are available for the CHO execution.

The existing CHO method (i.e., method 50) includes one or more preconditions, which are given below.

Candidate NTN cell frequencies are available to the UE via the system information block.

The network has configured conditional reconfiguration for one or more candidate NTN cells and one or more handover execution conditions.

In the existing CHO method, the network configures conditional reconfiguration using which the UE performs the CHO between NTN cells for the connected mode mobility similar to TN cell with one extra condition ensuring NTN service continuity and ubiquity. If the t-Service timer is configured in the UE for the serving NTN cell, then the UE needs to ensure that the CHO is performed before the t-service timer expiration such that UE does not experience NTN cell coverage loss. However, the existing CHO method has a few drawbacks, which are listed below.

The UE performs the CHO based on the signal strength or t-service length or distance threshold criteria, but this will

TABLE 10

IE ConditionalReconfiguration is used to add, modify, and release the configuration of conditional reconfiguration

```
ConditionalReconfiguration-r16 ::=   SEQUENCE {
  attemptCondReconfig-r16                ENUMERATED {true}               OPTIONAL,  -- Cond CHO
  condReconfigToRemoveList-r16           CondReconfigToRemoveList-r16    OPTIONAL,  -- Need N
  condReconfigToAddModList-r16           CondReconfigToAddModList-r16    OPTIONAL,  -- Need N
  ...
}
CondReconfigToRemoveList-r16 ::=     SEQUENCE (SIZE (1..maxNrofCondCells-r16)) OF CondReconfigId-r16
```

TABLE 11

IE CondReconfigToAddModList concerns a list of conditional reconfigurations to add or modify, with for each entry the condReconfigId and the associated condExecutionCond/condExecutionCondSCG and condRRCReconfig

```
CondReconfigToAddModList-r16 ::=   SEQUENCE (SIZE (1..maxNrofCondCells-r16)) OF CondReconfigToAddMod-r16
CondReconfigToAddMod-r16 ::=       SEQUENCE {
  condReconfigId-r16                         CondReconfigId-r16
  condExecutionCond-r16                      SEQUENCE (SIZE (1..2)) OF MeasId OPTIONAL, -- Need M
  CondRRCReconfig-r16                        OCTET STRING (CONTAINING RRCReconfiguration)
                                                     OPTIONAL,           -- Cond condReconfigAdd
  ...,
  [[
  condExecutionCondSCG-r17                   OCTET STRING (CONTAINING CondReconfigExecCondSCG-r17)
                                                     OPTIONAL,           -- Need M
  ]]
}
CondReconfigExecCondSCG-r17 ::=    SEQUENCE (SIZE (1..2)) OF MeasId
```

not necessarily ensure the best cell (e.g., suitable target cell/target node/candidate NTN cell) which will provide longer service duration in the target cell, as illustrated in FIGS. 6 and 7.

Although new evaluation conditions are added based on distance and service time for the NTN cells in condition reconfiguration for the CHO, the 3GPP does not define any additional criteria to choose the target NTN cell prior to the t-service timer expiry which satisfies the evaluation criteria in the CHO.

It is possible that UE performs the CHO to the neighboring cell (e.g., suitable target cell/target node/candidate NTN cell) with lesser service time or unfavorable trajectory with respect to the UE which may lead to the higher frequency of neighbor cell measurements causing more UE power consumption, as illustrated in FIGS. 6 and 7.

FIG. 6 is a sequence flow diagram illustrating a method 60 for a CHO according to the related art.

Referring to FIG. 6, at operation 61, the method 60 includes sending, by the serving NTN cell-A, a CHO request to the neighbor NTN cell-B and initiating the t-service timer. At operation 62, the method 60 includes receiving, by the serving NTN cell-A, upon sending the CHO request, a CHO configuration from the neighbor NTN cell-B. At operation 63, the method 60 includes sending, by the serving NTN cell-A, a CHO request to the neighbor NTN cell-C. At operation 64, the method 60 includes receiving, by the serving NTN cell-A, upon sending the CHO request, a CHO configuration from the neighbor NTN cell-B. At operation 65, the method 60 includes sending, by the serving NTN cell-A, the received CHO configuration associated with the neighbor NTN cell-B and the neighbor NTN cell-C to the UE.

At operations 66 and 67, the method 60 includes monitoring, by the UE, 3GPP specified CHO condition for the candidate target cell (e.g., neighbor NTN cell-B and neighbor NTN cell-C). The method 60 further includes performing, by the UE, the CHO to the neighbor NTN cell-B based on the CHO criteria by sending a CHO confirmation before the t-service timer expiry, where the UE gets a lesser duration of service (i.e., t-service). At operations 68 and 69, the method 60 includes initiating a t-service timer associated with the neighbor NTN cell-B and connecting with the neighbor NTN cell-B, where the UE disregards earlier trajectory information and duration of service related with the neighboring NTN cell-B. As a result, in the existing CHO method, the UE reselects the neighbor NTN cell-B with lesser service time or unfavorable trajectory with respect to the UE. To continue in NTN service, the UE must do another neighboring cell measurement immediately, which may lead to the higher frequency of neighbor cell measurements causing more UE power consumption, which is not desirable.

FIG. 7 illustrates a problem in an existing cell reselection and/or CHO method according to the related art.

Referring to FIG. 7, in a first scenario 71 at a first time period (e.g., t) and a second scenario 72 at a second time period (e.g., t+1), t-service_A, t-service_B, and t-service_C represent timers set by the network in the SIB-19 for cell-A, cell-B, and cell-C of the NTN respectively. Further, V_Ref-A, V_Ref-B, and V_Ref-C are velocity vectors for satellite_A, satellite_B, and satellite_C of the NTN, each with different directions. Furthermore, "u" represents a velocity vector of the UE. The UE is located in the cell-A, as illustrated in the first scenario 71, where the t-service (i.e., t-service_A) was about to expire. Meanwhile, the UE detects that the cell-B, and cell-C are candidate neighboring cells for the cell reselection or CHO. The value of the t-service for the cell-B is greater than the t-Service for the cell-C (t-service_B>t-service_C).

According to the aforementioned 3GPP standards, the UE must reselect another cell (e.g., cell-B or cell-C) before the t-service_A timer expires to avoid losing network coverage, as illustrated in the second scenario 72. If the UE chooses to reselect or perform the CHO to the cell-B based on the t-Service value, even though cell-B has a longer t-Service, the UE spends less time connected to it. This is because a direction and velocity of cell-B align in such a way that the UE's total service duration in Cell B will be shorter. As a result, the UE needs to perform more frequent measurements of neighboring cells to maintain continuous service, which leads to increased power consumption, which is not desirable.

Thus, it is desired to address the above-mentioned disadvantages or other shortcomings or at least provide a useful alternative for selecting the suitable target cell (optimal NTN cell) for the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for selecting a non-terrestrial network (NTN) cell for a user equipment (UE).

Additional aspects will be set forth in part in the description which follows and, in part, will be apparent from the description, or may be learned by practice of the presented embodiments.

In accordance with an aspect of the disclosure, a method for selecting an NTN cell by a user equipment (UE) is provided. The method includes receiving one or more system parameters from a serving NTN cell and a plurality of NTN neighbor cells, determining trajectory information associated with the plurality of NTN neighbor cells based on the one or more received system parameters, and selecting, based on the determined trajectory information associated with the plurality of NTN neighbor cells, the NTN cell among the plurality of NTN neighbor cells to perform at least one of a cell reselection or a conditional hand over (CHO).

In accordance with an aspect of the disclosure, a method for selecting the optimal NTN cell for the UE is provided. The method includes receiving one or more system parameters from the serving NTN cell and the plurality of NTN neighbor cells, determining a cell parameter associated with the UE and the plurality of NTN neighbor cells, determining a priority of the plurality of NTN neighbor cells based on the cell parameter and the one or more system parameters, and selecting, based on the determined priority, the optimal NTN cell among the plurality of NTN neighbor cells to perform at least one of the cell reselection or the CHO, where the optimal NTN cell has a highest priority.

In accordance with an aspect of the disclosure, a user equipment (UE) for selecting the NTN cell is provided. The UE includes a memory storing instructions, a communicator, and at least one processor operably coupled with the memory and the communicator. When the at least one processor executes the instructions, the at least one processor causes the UE to perform operations. The operations include receiving the one or more system parameters from the serving NTN cell and the plurality of NTN neighbor cells, determining trajectory information associated with the plurality of NTN neighbor cells based on the one or more received system parameters, and selecting, based on the determined trajectory information associated with the plurality of NTN neighbor cells, the NTN cell among the plurality of NTN neighbor cells to perform at least one of the cell reselection or the CHO.

In accordance with an aspect of the disclosure, a user equipment (UE) for selecting the optimal NTN cell is provided. The UE includes the system, where the system includes the processor coupled with the memory and the communicator, receive the one or more system parameters from the serving NTN cell and the plurality of NTN neighbor cells, determine the cell parameter associated with the UE and the plurality of NTN neighbor cells, determine the priority of the plurality of NTN neighbor cells based on the cell parameter and the one or more system parameters, and select, based on the determined priority, the optimal NTN cell among the plurality of NTN neighbor cells to perform at least one of the cell reselection or the CHO, where the optimal NTN cell has the highest priority.

In accordance with an aspect of the disclosure, a n-transitory computer readable storage medium storing instructions is provided. The instructions, when executed by at least one processor of a user equipment (UE), cause the UE to perform operations. The operations includes receiving one or more system parameters from a serving NTN cell and a plurality of NTN neighbor cells, determining trajectory information associated with the plurality of NTN neighbor cells based on the one or more received system parameters, and selecting, based on the determined trajectory information associated with the plurality of NTN neighbor cells, the NTN cell among the plurality of NTN neighbor cells to perform at least one of a cell reselection or a conditional hand over (CHO).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a flow diagram illustrating a method for selecting an optimal NTN cell among a plurality of NTN neighbor cells, based on a service time duration and trajectory information, for a CHO, according to an embodiment of the disclosure;

The same reference numerals are used to represent the same elements throughout the drawings.

DETAILED DESCRIPTION OF FIGURES

Figure 1:
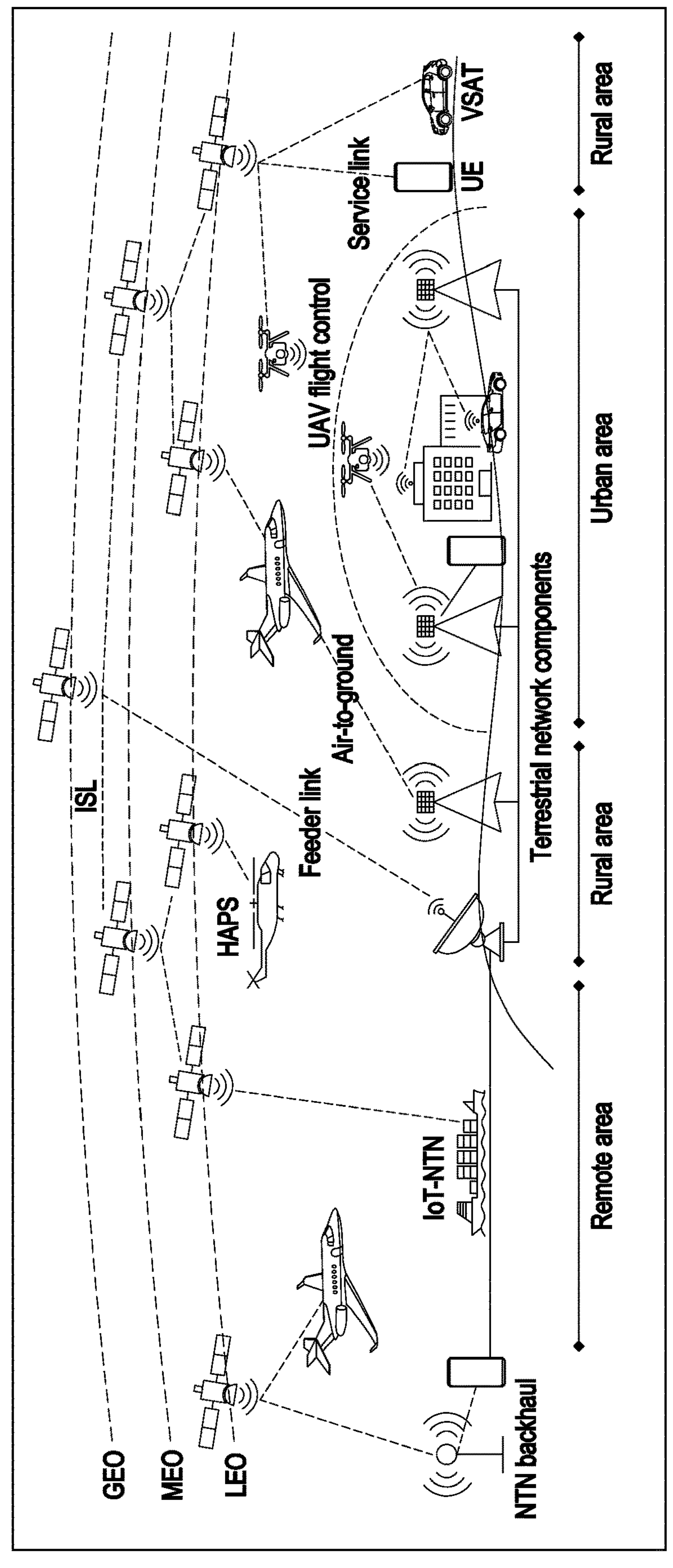
FIG. 1 illustrates a non-terrestrial network (NTN) according to the related art.
Figure 2:
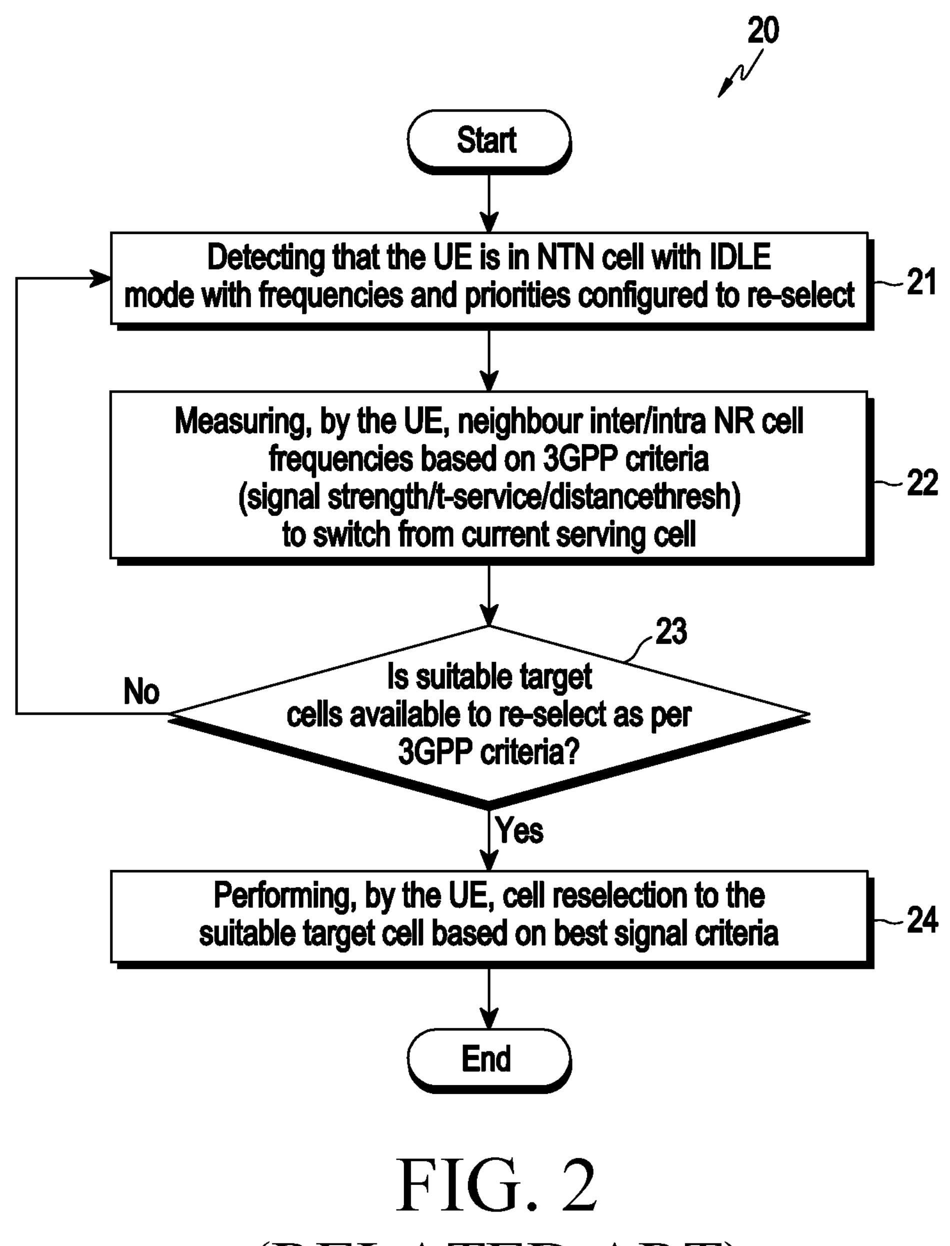
FIG. 2 is a flow diagram illustrating a method for a cell reselection according to the related art.
Figure 3:
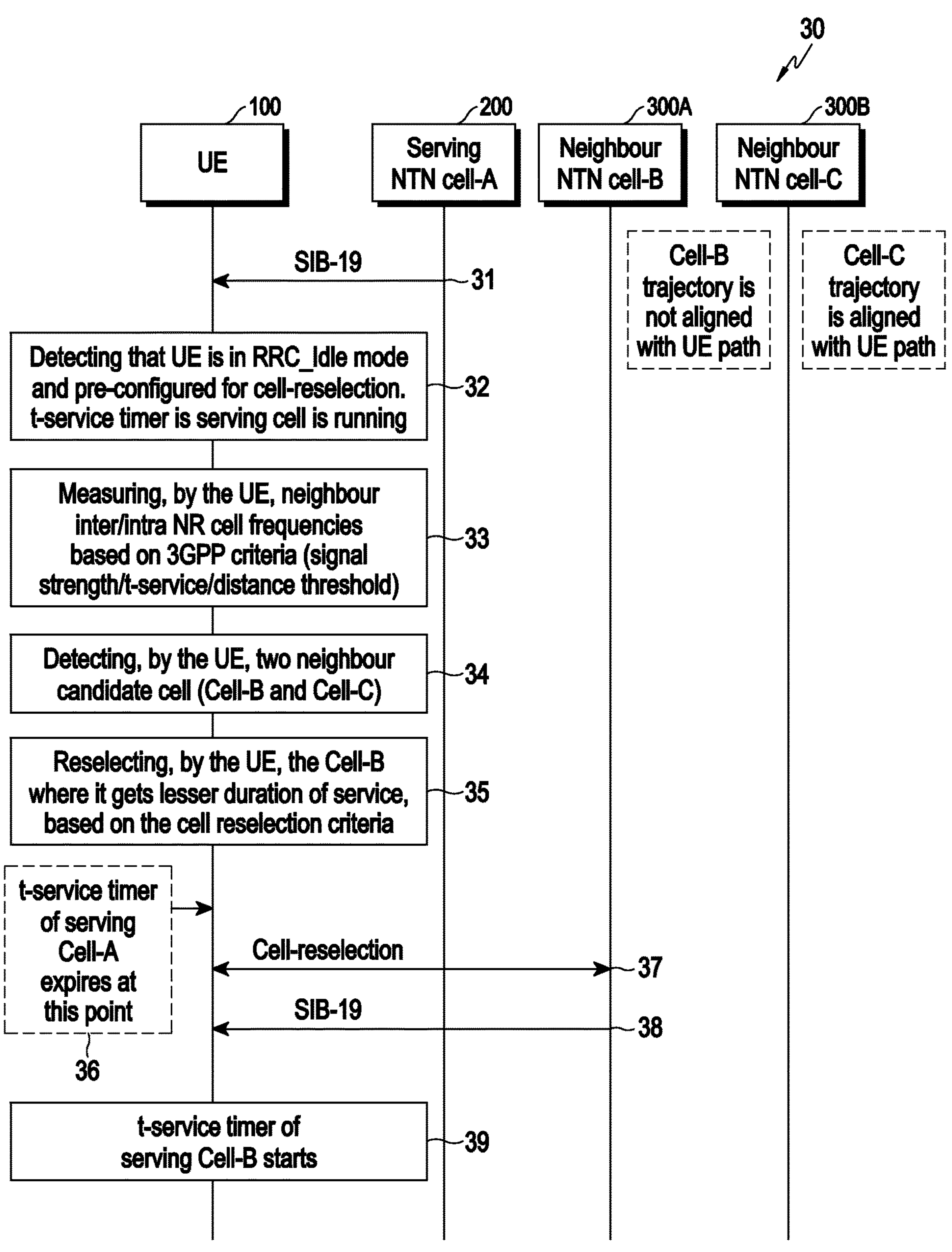
FIG. 3 is a sequence flow diagram illustrating a method for a cell reselection according to the related art.
Figure 4:
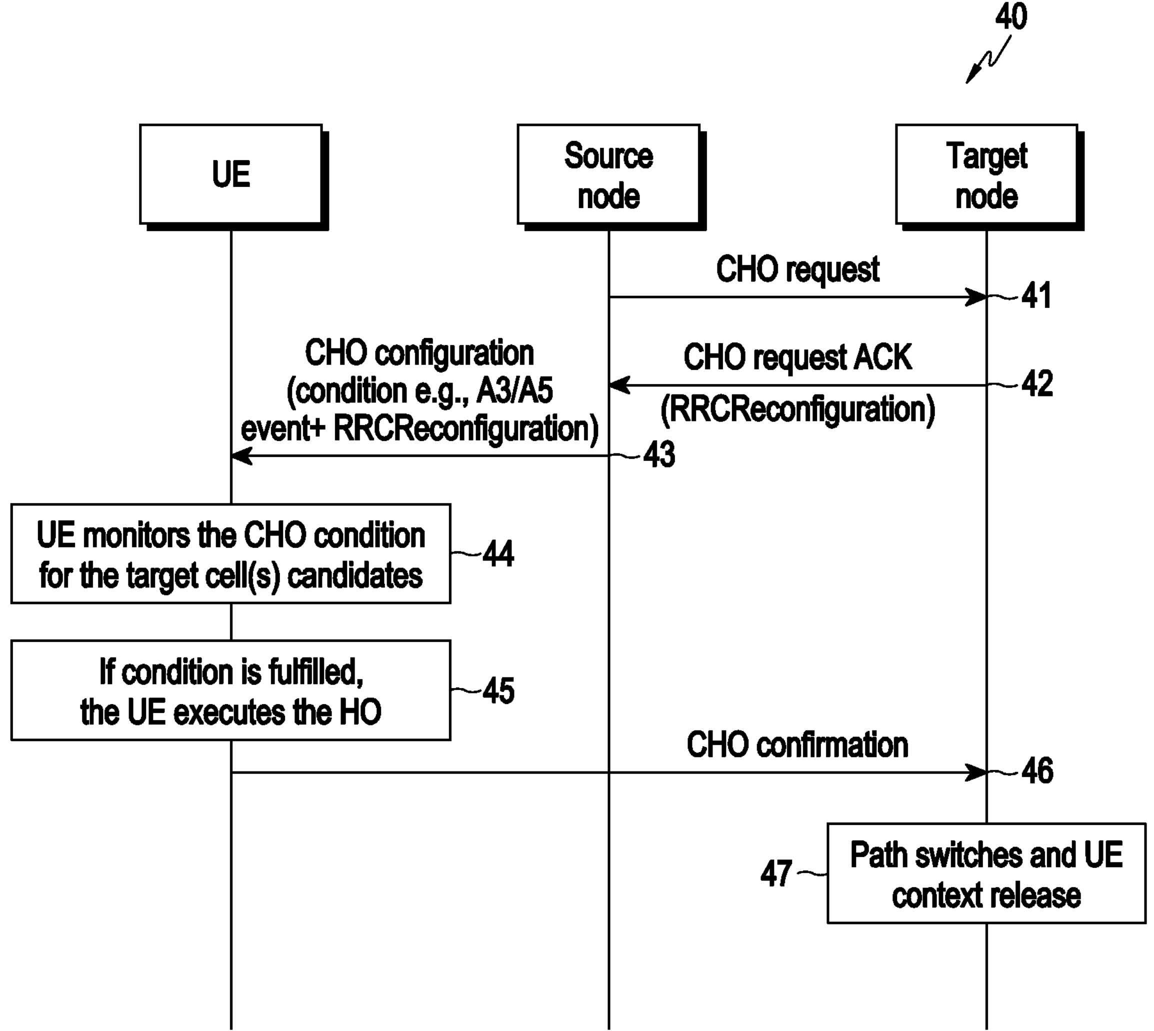
FIG. 4 is a flow diagram illustrating a method for a conditional hand over (CHO) according to the related art.
Figure 5:
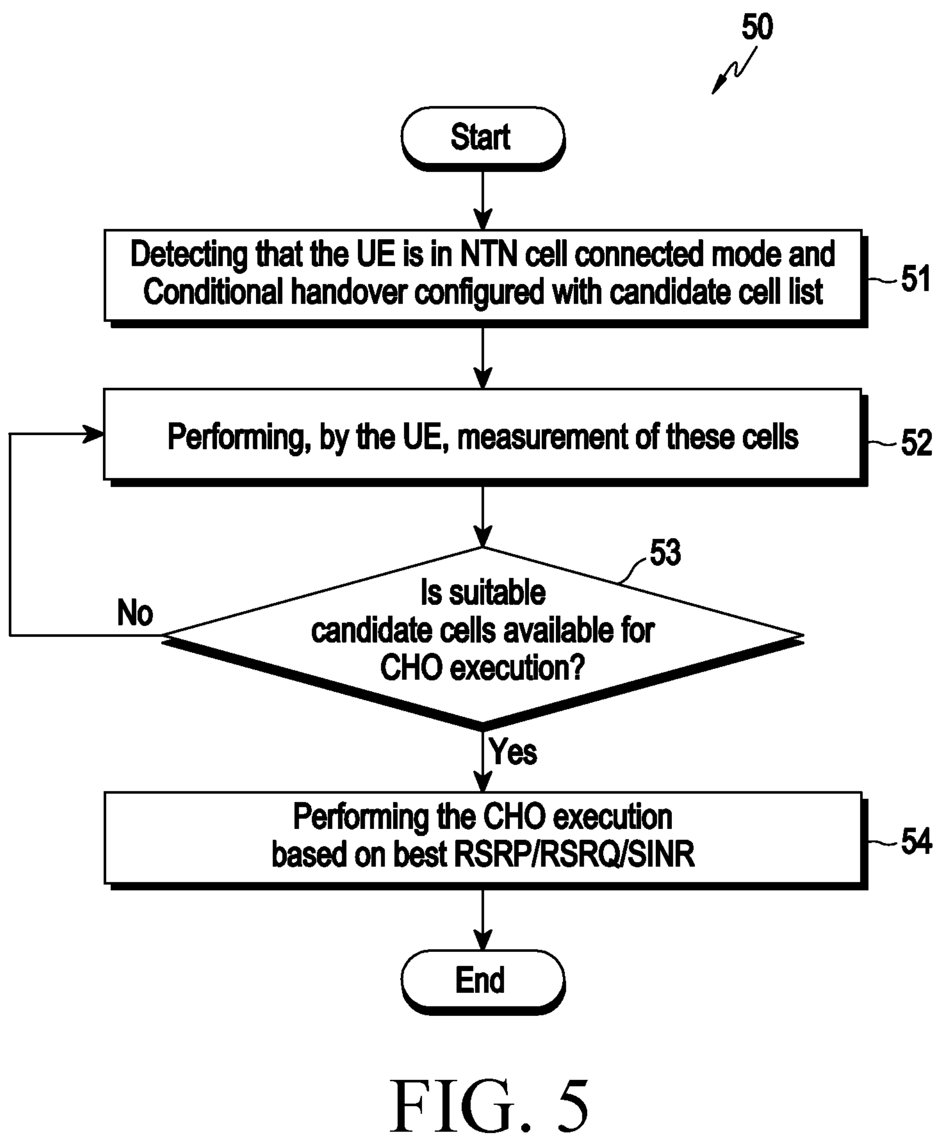
FIG. 5 is a flow diagram illustrating a method for a CHO according to the related art.
Figure 6:
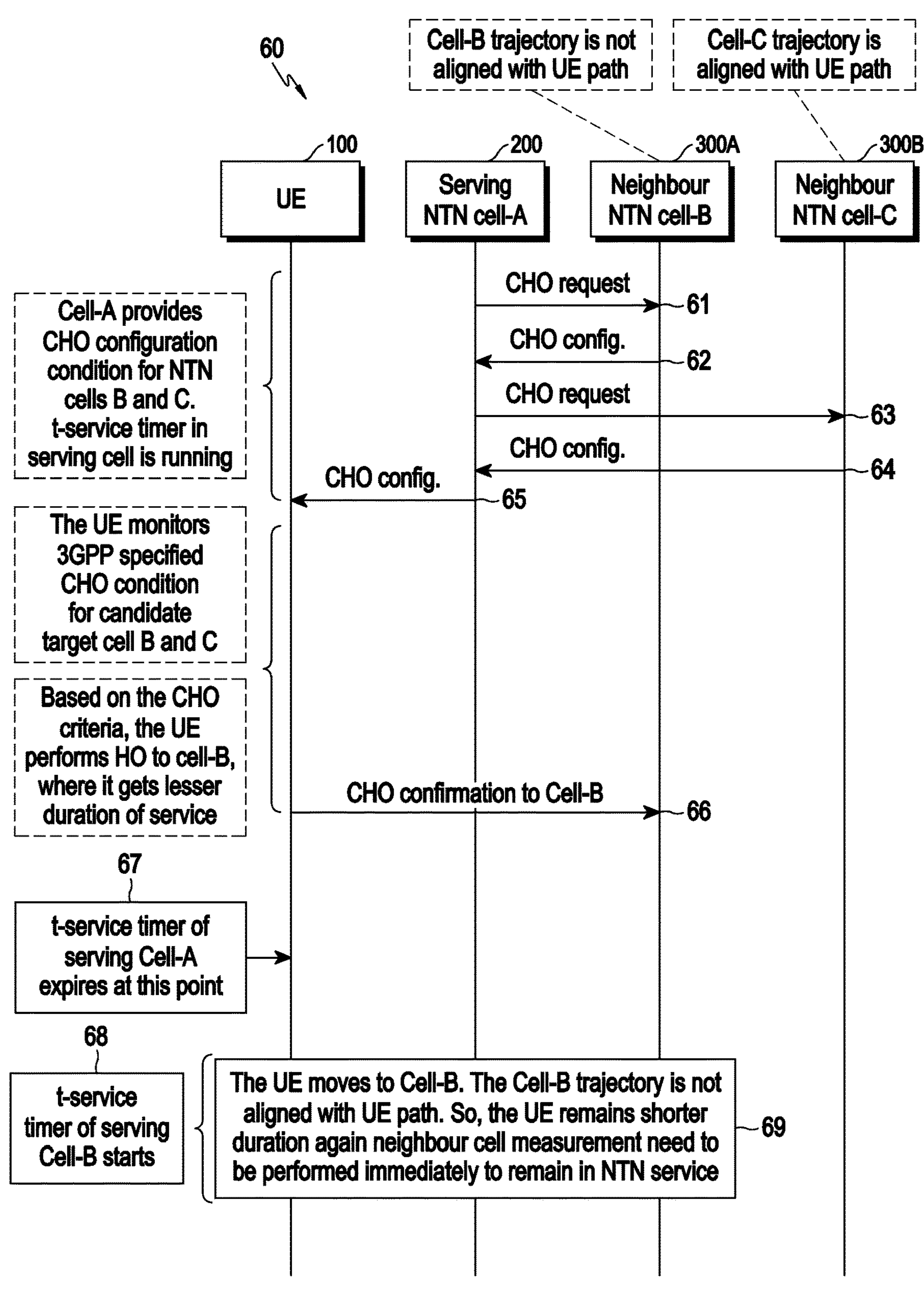
FIG. 6 is a sequence flow diagram illustrating a method for a CHO according to the related art.
Figure 7:
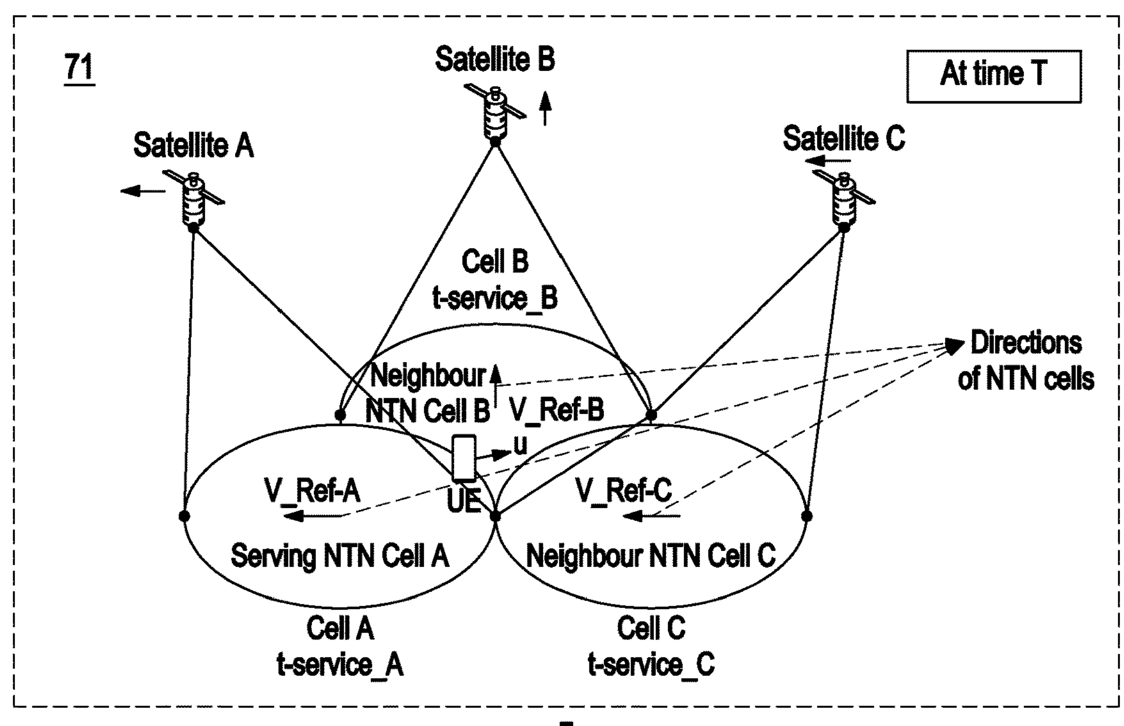
FIG. 7 illustrates a problem in an existing cell reselection and/or CHO method according to the related art.
Figure 7:
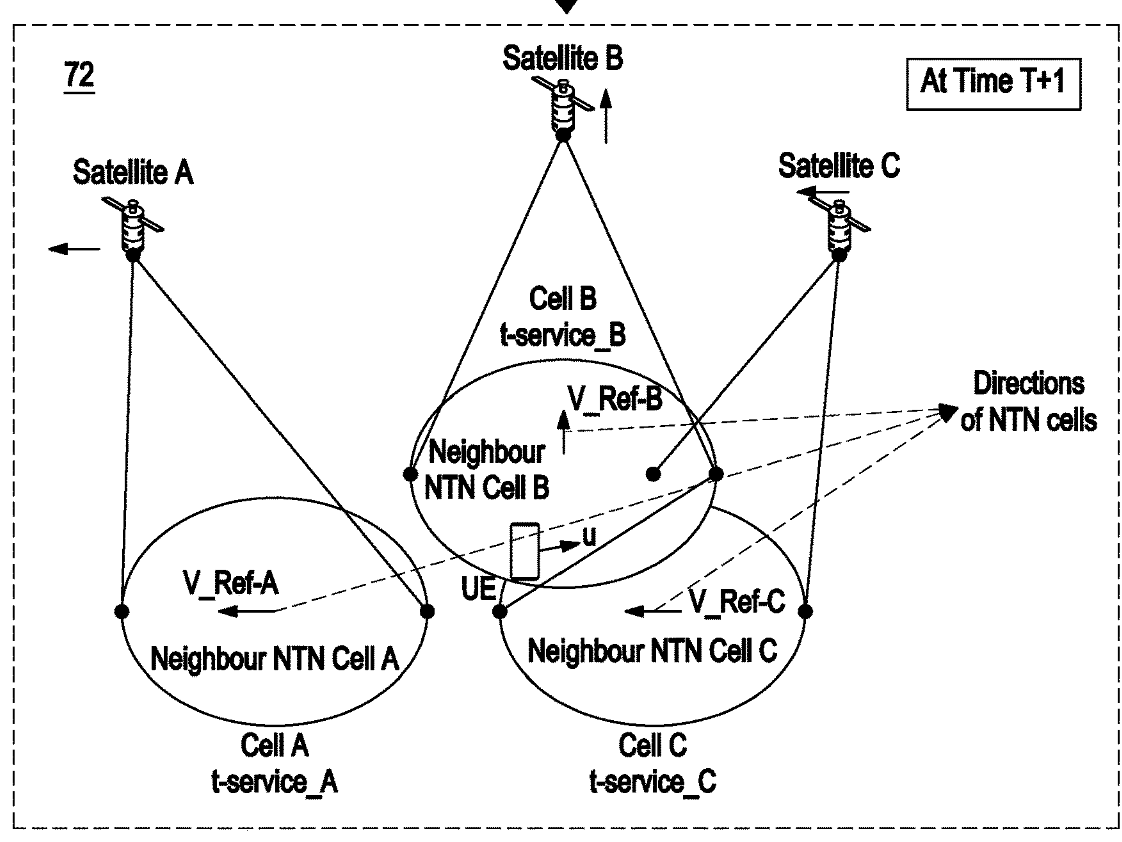

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Reference throughout this specification to “an aspect”, “another aspect” or similar language means that a particular feature, structure, or characteristic described in connection with the embodiment is included in at least one embodiment of the disclosure. Thus, appearances of the phrase “in an embodiment”, “in one embodiment”, “in another embodiment”, and similar language throughout this specification may, but do not necessarily, all refer to the same embodiment.

The terms “comprise”, “comprising”, or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by “comprises . . . a” does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. In addition, the various embodiments described herein are not necessarily mutually exclusive, as some embodiments can be combined with one or more other embodiments to form new embodiments. The term “or” as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits, such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, or the like, may be used herein to describe various elements, these elements should not be limited by these terms. These terms are generally only used to distinguish one element from another.

The embodiments listed below may be applicable for both Earth-fixed and Earth-moving NTN cell deployment scenarios as proposed in currently ongoing 3GPP Release 18 discussions.

Referring now to the drawings, and more particularly to FIGS. 8 to 17, where similar reference characters denote corresponding features consistently throughout the figures, there are shown preferred embodiments.

Figure 8:
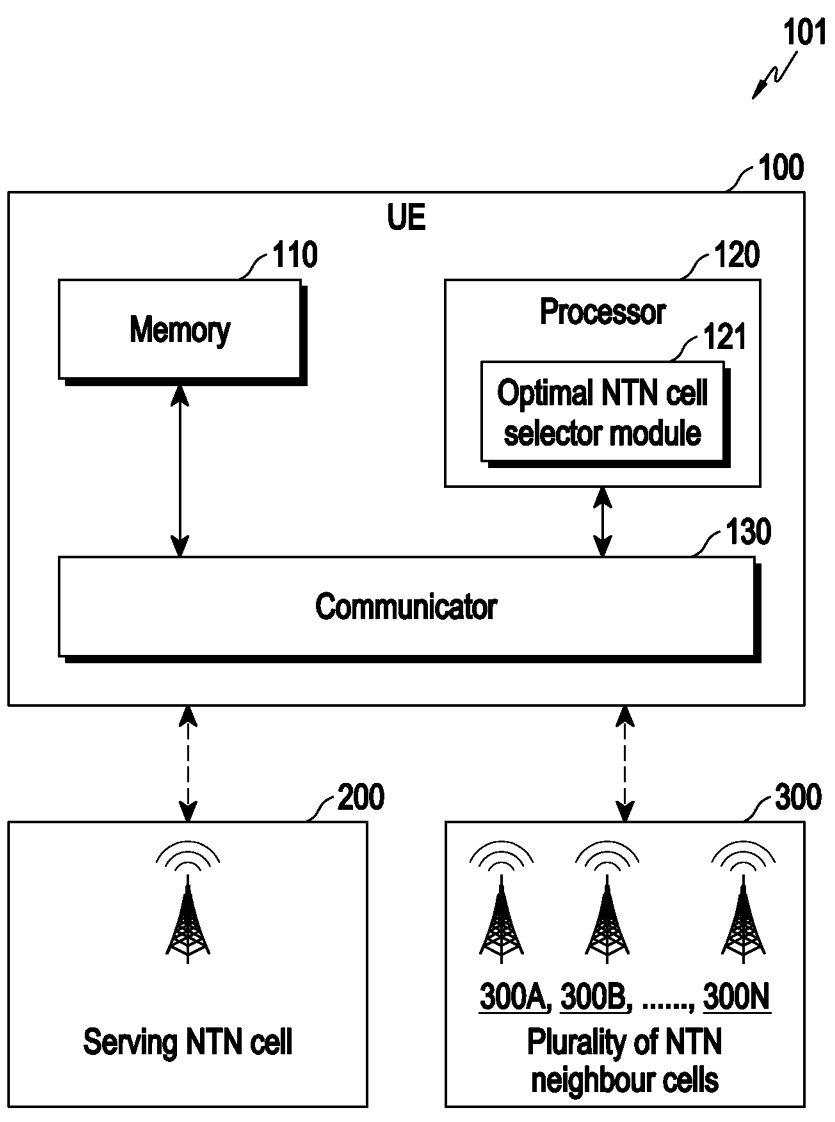
FIG. 8 illustrates a system block diagram where a user equipment (UE) selects an optimal non-terrestrial network (NTN) cell among a plurality of NTN neighbor cells according to an embodiment of the disclosure.

FIG. 8 illustrates a system block diagram where a user equipment (UE) selects an optimal non-terrestrial network (NTN) cell among a plurality of NTN neighbor cells according to an embodiment of the disclosure.

Referring to FIG. 8, examples of a UE 100 include, but are not limited to a smartphone, a tablet computer, a personal digital assistance (PDA), an Internet of things (IoT) device, a wearable device, or the like. In an embodiment of the disclosure, the UE 100 may include memory 110, a processor 120, and a communicator 130.

In an embodiment of the disclosure, the memory 110 stores instructions to be executed by the processor 120 for selecting the optimal NTN cell for the UE 100, as discussed throughout the disclosure. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term “non-transitory” may indicate that the storage medium is not embodied in a carrier wave or a propagated signal. However, the term “non-transitory” should not be interpreted that the memory 110 is non-movable. In some examples, the memory 110 can be configured to store larger amounts of information than the memory. In certain examples, a non-transitory storage medium may store data that can, over time, change (e.g., in random access memory (RAM) or cache). The memory 110 can be an internal storage unit, or it can be an external storage unit of the UE 100, a cloud storage, or any other type of external storage.

The processor 120 communicates with the memory 110 and the communicator 130. The processor 120 is configured to execute instructions stored in the memory 110 and to perform various processes for selecting the optimal NTN cell for the UE 100, as discussed throughout the disclosure. The processor 120 may include one or a plurality of processors, maybe a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator 130 is configured for communicating internally between internal hardware components and with external devices (e.g., server) via one or more networks (e.g., radio technology). The communicator 130 includes an electronic circuit specific to a standard that enables wired or wireless communication.

In one or more embodiments of the disclosure, the processor 120 may include an optimal NTN cell selector module 121. The optimal NTN cell selector module 121 is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like.

In one or more embodiments of the disclosure, the optimal NTN cell selector module 121 may receive one or more system parameters (e.g., system information block (SIB)-19 parameters) from a serving NTN cell 200 and the plurality of NTN neighbor cells 300. The one or more SIB-19 parameters comprise at least one of a service time value, a distance threshold, an NTN configuration, a reference location, an NTN uplink synchronization validity duration timer, ephemeris information (EphemerisInfo), and a rate of change of signal condition. The optimal NTN cell selector module 121 may further determine an availability of a service time duration (e.g., t-service) associated with the one or more received system parameters for the serving NTN cell 200 and the plurality of NTN neighbor cells 300 prior to an expiration of the service time duration of the serving NTN cell 200. The optimal NTN cell selector module 121 may further determine trajectory information associated with the UE 100 based on a navigation mechanism (e.g., global positioning system (GPS)) of the UE 100 and trajectory information associated with the plurality of NTN neighbor cells 300 based on the one or more received system parameters. The optimal NTN cell selector module 121 may further select, based on the determined service time duration, the determined trajectory information associated with the UE 100, and the determined trajectory information associated with the plurality of NTN neighbor cells 300, the optimal NTN cell among the plurality of NTN neighbor cells 300 that are satisfying evaluation criteria to perform at least one of a cell reselection, as described in conjunction with FIGS. 9, 11, and 15, and a conditional handover (CHO), as described in conjunction with FIGS. 12, 14, and 15.

In one or more embodiments of the disclosure, the optimal NTN cell selector module 121 may receive one or more system parameters from the serving NTN cell 200 and the plurality of NTN neighbor cells 300. The optimal NTN cell selector module 121 may further determine a cell parameter (T_cell) associated with the UE 100 and the plurality of NTN neighbor cells 300. The optimal NTN cell selector module 121 may further determine a priority (priority_cell) of the plurality of NTN neighbor cells 300 based on the cell parameter (T_cell) and the one or more system parameters. The optimal NTN cell selector module 121 may further select, based on the determined priority (priority_cell) (i.e., weightage), the optimal NTN cell among the plurality of NTN neighbor cells 300 to perform at least one of the cell reselection, as described in conjunction with FIGS. 10, 11, and 15, and the CHO, as described in conjunction with FIGS. 13, 14, and 15, wherein the optimal NTN cell has a highest priority.

In one or more embodiments of the disclosure, a function associated with the various components of the UE 100 may be performed through the non-volatile memory, the volatile memory, and the processor 120. One or a plurality of processors controls the processing of the input data in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/or may be implemented through a separate server/system. The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

The AI model may consist of a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann machine (RBM), deep belief network (DBN), bidirectional recurrent deep neural network (BRDNN), generative adversarial networks (GAN), and deep Q-networks.

Although FIG. 8 shows various hardware components of the UE 100, but it is to be understood that other embodiments are not limited thereon. In other embodiments of the disclosure, the UE 100 may include less or more number of components. Further, the labels or names of the components are used only for illustrative purposes and do not limit the scope of the disclosure. One or more components can be combined to perform the same or substantially similar functions to select the optimal NTN cell for the UE 100.

Figure 9:
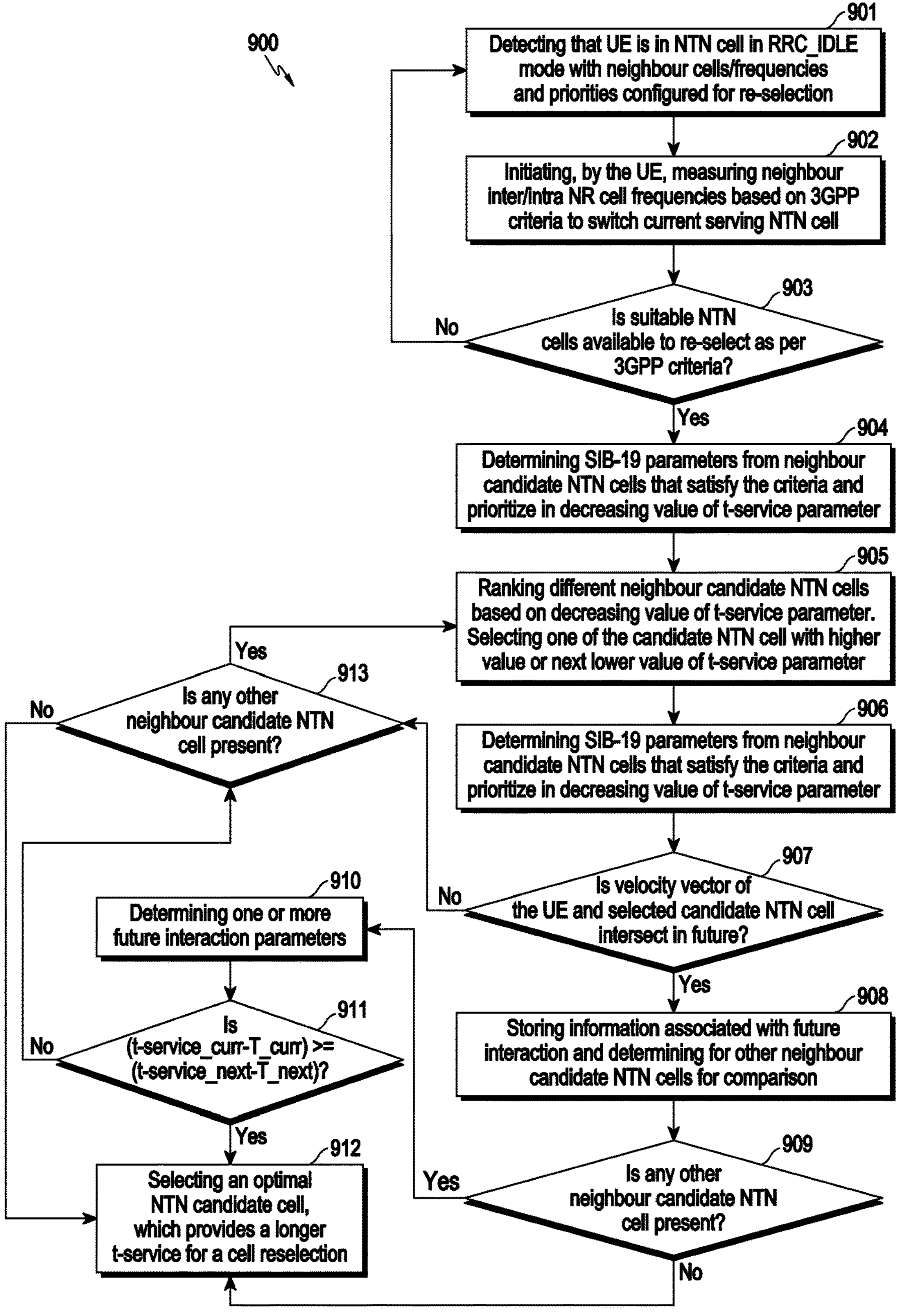
FIG. 9 is a flow diagram illustrating a method for selecting an optimal NTN cell among a plurality of NTN neighbor cells, based on a service time duration and trajectory information, for the cell reselection, according to an embodiment of the disclosure.

FIG. 9 is a flow diagram illustrating a method 900 for selecting an optimal NTN cell among a plurality of NTN neighbor cells based on a service time duration and trajectory information, for a cell reselection according to an embodiment of the disclosure.

Referring to FIG. 9, at operation 901, the method 900 includes detecting that UE 100 is in the NTN cell (e.g., the serving NTN cell 200) in RRC_IDLE mode with neighbor cells/frequencies and priorities configured for re-selection. At operation 902, the method 900 includes initiating, by the UE 100, measuring neighbor inter/intra NR cell frequencies based on the 3GPP criteria to switch from the current serving NTN cell (e.g., the serving NTN cell 200). At operation 903, the method 900 includes determining whether a suitable NTN cell among the plurality of NTN neighbor cells 300 is available for the cell reselection as per the 3GPP criteria. The method 900 includes continuously monitoring the above-mentioned operations 901 and 902 in response to determining that the suitable NTN cell among the plurality of NTN neighbor cells 300 is not available for the cell reselection as per the 3GPP criteria.

At operation 904, the method 900 includes determining the one or more SIB-19 parameters from the serving NTN cell 200 and/or the plurality of NTN neighbor cells 300 in response to determining that the suitable NTN cell among the plurality of NTN neighbor cells 300 is available for the cell reselection as per the 3GPP criteria. The method 900 further includes determining the availability of the service time duration associated with the one or more received SIB-19 parameters for the serving NTN cell 200 and the plurality of NTN neighbor cells 300 prior to the expiration of the service time duration of the serving NTN cell 200. The one or more SIB-19 parameters comprise at least one of the service time value, the distance threshold, the NTN configuration, the reference location, the NTN uplink synchronization validity duration timer, ephemeris information (EphemerisInfo), and the rate of change of signal condition. The method 900 further includes determining the trajectory information associated with the UE 100 based on the navigation mechanism of the UE 100 and trajectory information associated with the plurality of NTN neighbor cells 300 based on the one or more received SIB-19 parameters. In one embodiment of the disclosure, the trajectory information is determined based on a position vector associated with the UE 100 and a velocity vector associated with the UE 100.

At operation 905, the method 900 includes ranking the availability of the service time duration associated with the plurality of NTN neighbor cells 300 in a descending order, where a first NTN neighbor cell (e.g., 300A) among the plurality of NTN neighbor cells 300 has a first service time duration that is highest among other service time durations of other NTN neighbor cells of the plurality of NTN neighbor cells 300, and/or, for next iteration, detecting a second service time duration associated with a second NTN neighbor cell (e.g., 300B) among the plurality of NTN neighbor cells 300, wherein the second service time duration is a next highest service time duration among other service time durations of other NTN neighbor cells of the plurality of NTN neighbor cells 300.

At operations 906 and 907, the method 900 includes determining, based on the determined trajectory information associated with the first NTN neighbor cell (e.g., 300A) and the determined trajectory information associated with the UE 100, whether a future interaction occurs between the first NTN neighbor cell (e.g., 300A) and the UE 100. The method 900 further includes determining whether any other NTN neighbor cell (e.g., 300B, 300C, . . . , 300N) is present (913) in response to determining that the future interaction does not occur between the first NTN neighbor cell (e.g., 300A) and the UE 100. The method 900 further includes performing one or more operations (905 to 907) in response to determining that any other NTN neighbor cell (e.g., 300B, 300C, . . . , 300N) is present (913), otherwise the UE 100 may select the optimal NTN cell as, for example, the first NTN neighbor cell (e.g., 300A) for the cell reselection (912). The above-mentioned operations may repeat for the next iteration associated with the second NTN neighbor cell (e.g., 300B), where the method 900 includes determining, based on the determined trajectory information associated with the second NTN neighbor cell and the determined trajectory information associated with the UE 100, whether a future interaction occurs between the second NTN neighbor cell and the UE 100.

At operation 908, the method 900 includes storing, in response to determining that the future interaction occurs between the first NTN neighbor cell (e.g., 300A) and the UE 100 in a database associated with the UE 100. The above-mentioned operation may repeat for the next iteration associated with the second NTN neighbor cell (e.g., 300B), where the method 900 includes storing, in response to determining that the future interaction occurs between the second NTN neighbor cell and the UE 100, the future interaction occurs between the second NTN neighbor cell and the UE 100 in the database associated with the UE 100.

At operation 909, the method 900 includes determining whether any other NTN neighbor cell (e.g., 300B, 300C, . . . , 300N) is present. The method 900 includes selecting the optimal NTN cell as, for example, the first NTN neighbor cell (e.g., 300A) for the cell reselection in response to determining that any other NTN neighbor cell (e.g., 300B, 300C, . . . , 300N) is not present at operation 912. At operation 910, the method 900 includes determining, in response to determining that the future interaction occurs between the first NTN neighbor cell and the UE 100, one or more future interaction parameters associated with the first NTN neighbor cell, for example, as described in Table 12 below.

TABLE 12

| One or more future interaction parameters | Define |
|---|---|
| First service time value corresponds to the first NTN neighbor cell, (t-service_curr) | t-service value for the current iteration candidate cell |
| Second service time value corresponds to the second NTN neighbor cell, (t-service_next) | t-service value for the next iteration candidate cell |
| First-time value, (T_curr) | The first-time value represents an amount of time taken by the UE to reach at a first location associated with the first NTN neighbor cell. In other words, time taken for the UE to reach the current iteration candidate cell. |
| Second-time value, (T_next) | The second-time value represents an amount of time taken by the UE to reach at a second location associated with the second NTN neighbor cell. In other words, the time taken for the UE to reach the next iteration candidate cell. |
| T_curr or T_next | (Distance between UE position and candidate cell position)/(Relative velocity of the UE and candidate cell satellite) |
| First difference value, (t-service_curr − T_curr) | The first difference value indicates a difference between the service time value for the first NTN neighbor cell and the first-time value. In other words, the time for which the UE may be in service in the current iteration candidate cell till its NTN service expires. |
| Second difference value, (t-service_next − T_next) | The second difference value indicates a difference between the service time value for the second NTN neighbor cell and the second-time value. In other words, the time for which UE will be in service in the next iteration candidate cell till its NTN service expires. |

The above-mentioned operation may repeat for the next iteration associated with the second NTN neighbor cell (e.g., 300B), where the method 900 includes determining, in response to determining that the future interaction occurs between the second NTN neighbor cell (e.g., 300B) and the UE 100, one or more future interaction parameters associated with the first NTN neighbor cell and the second NTN neighbor.

At operations 911 and 912, the method 900 includes selecting the optimal NTN cell among the plurality of NTN neighbor cells 300 based on the one or more determined future interaction parameters, which provides a longer t-service. In other words, the method 900 includes determining whether the first difference value is greater than the second difference value. The UE 100 selects the optimal NTN cell (i.e., current iteration candidate cell) among the plurality of NTN neighbor cells 300 in response to determining that the first difference value is greater than the second difference value. Otherwise, the method 900 includes performing one or more operations (e.g., 913) for the next iteration candidate cell.

In the method 900, the UE may prioritize the candidate NTN cell (e.g., first NTN neighbor cell 300A) with the highest t-service timer along its trajectory, preferring the cell reselection to the candidate NTN cell that provides service to the UE 100 for a longer duration than the next candidate NTN cell (e.g., second NTN neighbor cell 300B) and the UE 100 may require less frequent neighboring cell measurements by utilizing the one or more received the SIB-19 (e.g., t-service, reference location, ephemerisInfo) and UE's instantaneous location (position vector) and direction (velocity vector) using the navigation mechanism of the UE 100, for example, global navigation satellite system (GNSS). As a result, the UE 100 consumes less power during the cell reselection.

Figure 10:
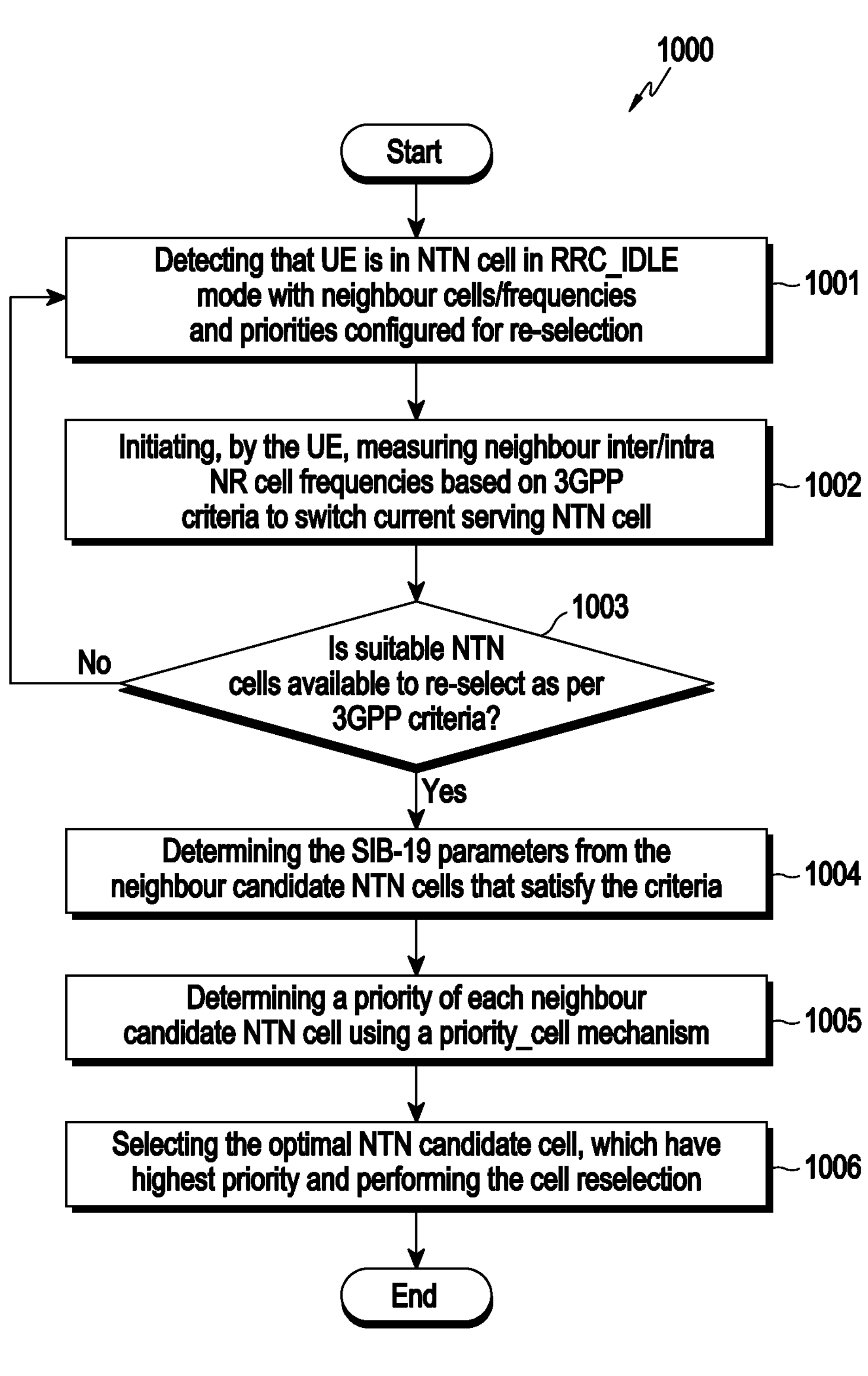
FIG. 10 is a flow diagram illustrating a method for selecting an optimal NTN cell among a plurality of NTN neighbor cells, based on weightage information, for the cell reselection, according to an embodiment of the disclosure.

FIG. 10 is a flow diagram illustrating a method 1000 for selecting the optimal NTN cell among the plurality of NTN neighbor cells 300, based on the weightage information, for the cell reselection, according to an embodiment of the disclosure.

Referring to FIG. 10, at operation 1001, the method 1000 includes detecting that the UE 100 is in NTN cell in RRC_IDLE mode with neighbor cells/frequencies and priorities configured for the cell reselection, which relates to operation 901 of FIG. 9. At operation 1002, the method 1000 includes initiating, by the UE 100, the measuring neighbor inter/intra NR cell frequencies based on the 3GPP criteria to switch currently serving NTN cell, which relates to operation 902 of FIG. 9. At operation 1003, the method 1000 includes determining whether the suitable NTN cell among the plurality of NTN neighbor cells 300 is available for the cell reselection as per the 3GPP criteria, which relates to operation 903 of FIG. 9. The method 900 includes continuously monitoring the above-mentioned operations (1001 and 1002) in response to determining that the suitable NTN cell among the plurality of NTN neighbor cells 300 is not available for the cell reselection as per the 3GPP criteria.

At operation 1004, the method 1000 includes determining the one or more SIB-19 parameters from the serving NTN cell 200 and/or the plurality of NTN neighbor cells 300 in response to determining that the suitable NTN cell among the plurality of NTN neighbor cells 300 is available for the cell reselection as per the 3GPP criteria, which relates to operation 904 of FIG. 9. At operation 1005, the method 1000 includes determining a priority of each neighbor candidate NTN cell using a priority_cell mechanism, as described in the Equations 1 and 2 below.

$$\text{T\_cell} = \frac{\text{Distance between } UE \text{ position and candidate cell position}}{\text{Relative velocity of } UE \text{ and candidate satellite}} \quad \text{Equation 1}$$

$$\text{Priority\_cell} = \frac{\begin{gathered}((0.5 * t\text{-Service\_cell}) + (0.3 * \text{intersection\_status}) + \\ (0.1 * (t\text{-Service\_cell} - \text{T\_cell})) + (0.1 * ntn\text{-}UlSyncValidityDuration))\end{gathered}}{((2 * t\text{-Service\_cell}) + \text{intersection\_status} + ntn\text{-}UlSyncValidityDuration - \text{T\_cell})} \quad \text{Equation 2}$$

Here, the cell parameter (T_cell) is determined based on a distance between a UE position and an NTN neighbor cell position by utilizing a quasi-earth fixed location from the SIB-19 of the NTN neighbor cell (e.g., 300A, 300B, or the like), and a relative velocity of the UE 100 and satellite associated with the NTN neighbor cell. Once the T_cell is determined, the UE 100 may determine a period that the UE 100 may be in service in the NTN neighbor cell until its t-service timer expires, which is determined based on the t-service_cell-T_cell. Additionally, the UE 100 then determines an intersection status, which may indicate whether or not the UE 100 and satellite's velocity vectors may cross in the future, represented by the intersection status, where "0" indicates that the UE 100 and satellite (e.g., NTN neighbor cell) do not intersect and a value of "1" indicates that the UE 100 and satellite do intersect in the future.

In one or more embodiments of the disclosure, the weightage for each independent parameter in the above-disclosed equation is decided by a degree of its effect in determining the optimum candidate cell for the UE to prefer for cell-reselection/CHO by using one or more AI/machine learning (ML) models.

For example, the highest weightage (0.5) is given to t-service_cell since the higher the value of t-service for a cell, the higher the duration for which the NTN neighbor cell (e.g., 300A, 300B, or the like) may provide NTN service to the UE 100. After prioritizing the t-service of the cell, the method 1000 ensures that the trajectory of the UE 100 and the NTN neighbor cell (e.g., 300A, 300B, or the like) may intersect in the future or not. This is taken into consideration by the intersection status parameter with weightage (0.3). The duration for which the UE 100 may be in service in the NTN neighbor cell (e.g., 300A, 300B, or the like) and duration for which the SIB-19 parameters/information would be valid is assigned the least weightage (0.1) in ranking the NTN neighbor cell (e.g., 300A, 300B, or the like).

In one or more embodiments of the disclosure, the method 1000 includes assigning the priority to all NTN neighbor cell (e.g., 300A, 300B, or the like) based on the above weightage Equation 2. The NTN neighbor cell which has the highest weightage may have the highest priority. The priority of the NTN neighbor cell may be arranged in the decreasing order.

At operation 1006, the method 1000 includes selecting, based on the determined priority (priority_cell), the optimal NTN cell among the plurality of NTN neighbor cells 300 to perform the cell reselection, where the optimal NTN cell has the highest priority. As result, the UE 100 consumes less power during the cell reselection.

Figure 11:
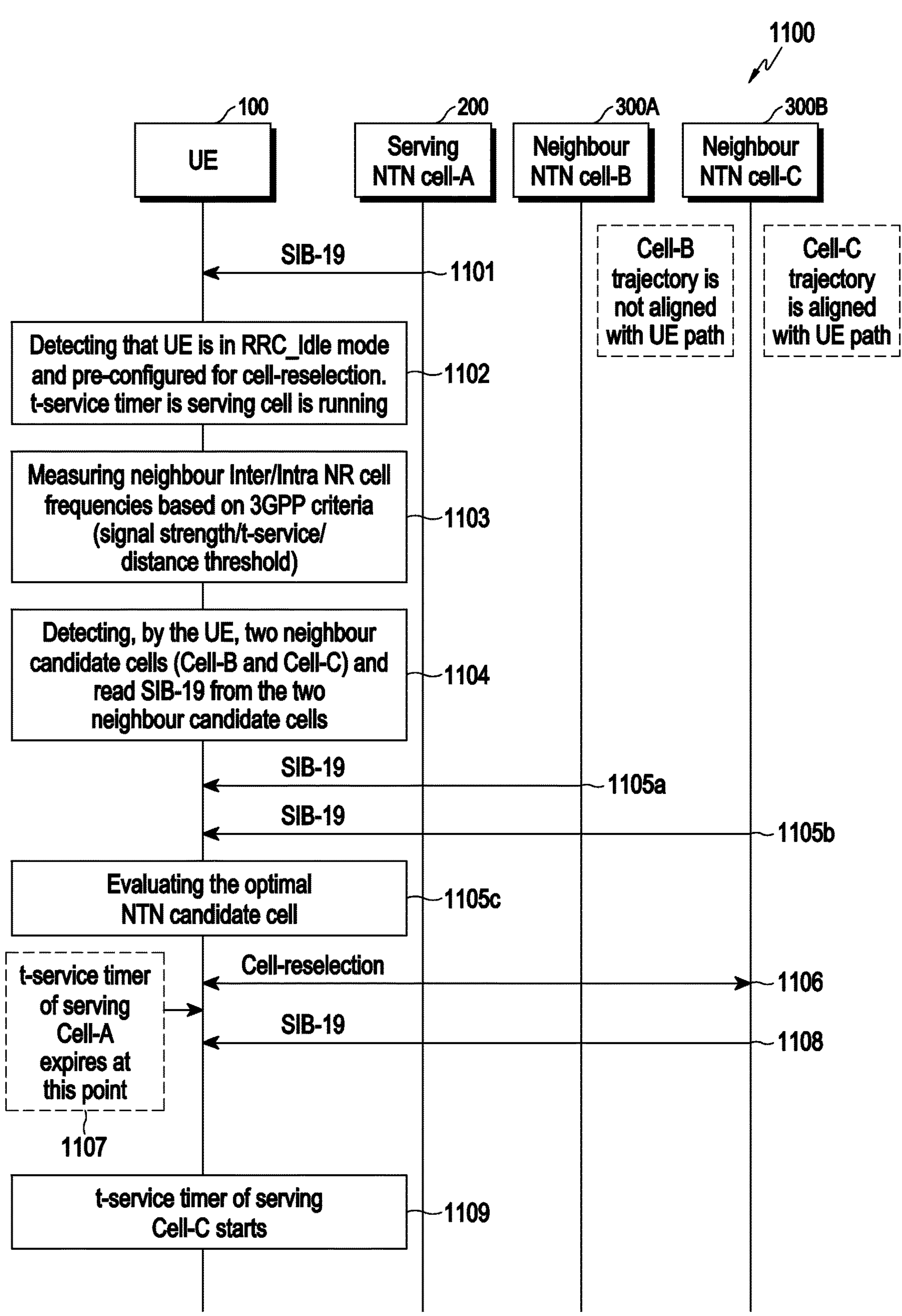
FIG. 11 is a sequence flow diagram illustrating a method for a cell reselection according to an embodiment of the disclosure.

FIG. 11 is a sequence flow diagram illustrating a method 1100 for a cell reselection according to an embodiment of the disclosure.

Referring to FIG. 11, at operation 1101, the method 1100 includes the receiving, by the UE 100, the SIB-19 from the serving NTN cell (serving NTN cell-A 200). At operation 1102, the method 1100 includes detecting that UE is in the RRC idle mode and pre-configured for cell-reselection. Additionally, the UE initiates the t-service timer associated with the serving NTN cell-A. At operation 1103, the method 1100 includes measuring, by the UE 100, the neighbor inter/intra NR cell frequencies based on the 3GPP criteria. At operation 1104, the method 1100 includes detecting, by the UE 100, based on the measuring, two neighbor candidate cells (e.g., neighbor NTN cell-B 300A and neighbor NTN cell-C 300C).

At operations 1105*a*, 1105*b*, and 1105*c*, the method 1100 includes receiving the one or more SIB-19 parameters from the plurality of NTN neighbor cells 300 (e.g., neighbor NTN cell-B 300A and neighbor NTN cell-C 300C), where the neighbor NTN cell-B 300A trajectory is not aligned with UE path, in other words less t-service time, and the neighbor NTN cell-C 300C trajectory is aligned with the UE path. The method 1100 includes evaluating the optimal NTN cell among the plurality of NTN neighbor cells 300 by performing one or more operations, as described in conjunction with FIGS. 9 and 10, for example, as shown in Table 13.

TABLE 13

| NTN Cell Parameters | Cell-A | Cell-B | Cell-C |
|---|---|---|---|
| Signal condition (RSRP) | −100 dBm | −95 dBm | −97 dBm |
| T-Service (T_a < T_b < T_c) | T_a | T_b | T_c |
| Trajectory | Away from UE's trajectory | Away from UE's trajectory | Towards UE's trajectory |
| SIB19 validity duration | 5 sec | 5 sec | 10 sec |
| Future Intersection (based on EphemerisInfo) | False | False | True |
| Determined actual time duration going to be in Cell | Low | Low | High |

At operations 1106 and 1107, the method 1100 includes reselecting, by the UE 100, the neighbor NTN cell-C 300C by sending the cell reselection request before the expiration of the t-service timer associated with the serving NTN cell-A 200, where the UE 100 gets a higher duration of service. At operations 1108 and 1109, the method 1100 includes receiving, upon sending the cell-reselection request, the SIB-19 from the neighbor NTN cell-C 300C and initiating, upon receiving the SIB-19, a t-service timer associated with the serving neighbor NTN cell-C 300C. As a result, in the disclosed cell reselection method (1100), the UE 100 reselects the neighbor NTN cell-C 300C with higher service time or favorable trajectory with respect to the UE 100, which may lead to a lower frequency of neighbor cell measurements, causing less UE power consumption, which is desirable. Further, the disclosed cell reselection method (900 and 1000) has several advantages over the existing cell reselection method (20 and 30), which are described in Table 14.

TABLE 14

| Existing cell reselection method | Disclosed cell reselection method |
|---|---|
| Without evaluating the future service duration in the different neighbor cells, the UE performed cell reselection to Cell B based on the signal strength and distance threshold directly where UE will be in NTN service for a shorter duration. | The UE reads SIB-19 of different NTN neighbor cells and evaluates them based on their t-Service parameter, the UE/Cell trajectory, SIB19 validity, and actual NTN service duration. |
| Although another cell (Cell C) was present which could have provided a better service duration, UE did not perform cell reselection to Cell C. | Based on SIB-19, the UE 100 may determine that Cell C is more preferred for cell-reselection since its trajectory more aligned towards the UE and the UE may be in NTN service for a longer duration. |
| The existing cell reselection method does not take into consideration t-Service, UE/Cell trajectory, SIB19 validity, and actual NTN service duration of candidate cells due to which the optimal target cell minimizing frequent future neighbor cell measurements for NTN service continuity by UE cannot be ensured. | The disclosed cell reselection method ensures that UE chooses the optimal target cell for Cell-Reselection leading to less frequent future neighbor cell measurements for NTN service continuity. |

Figure 12:
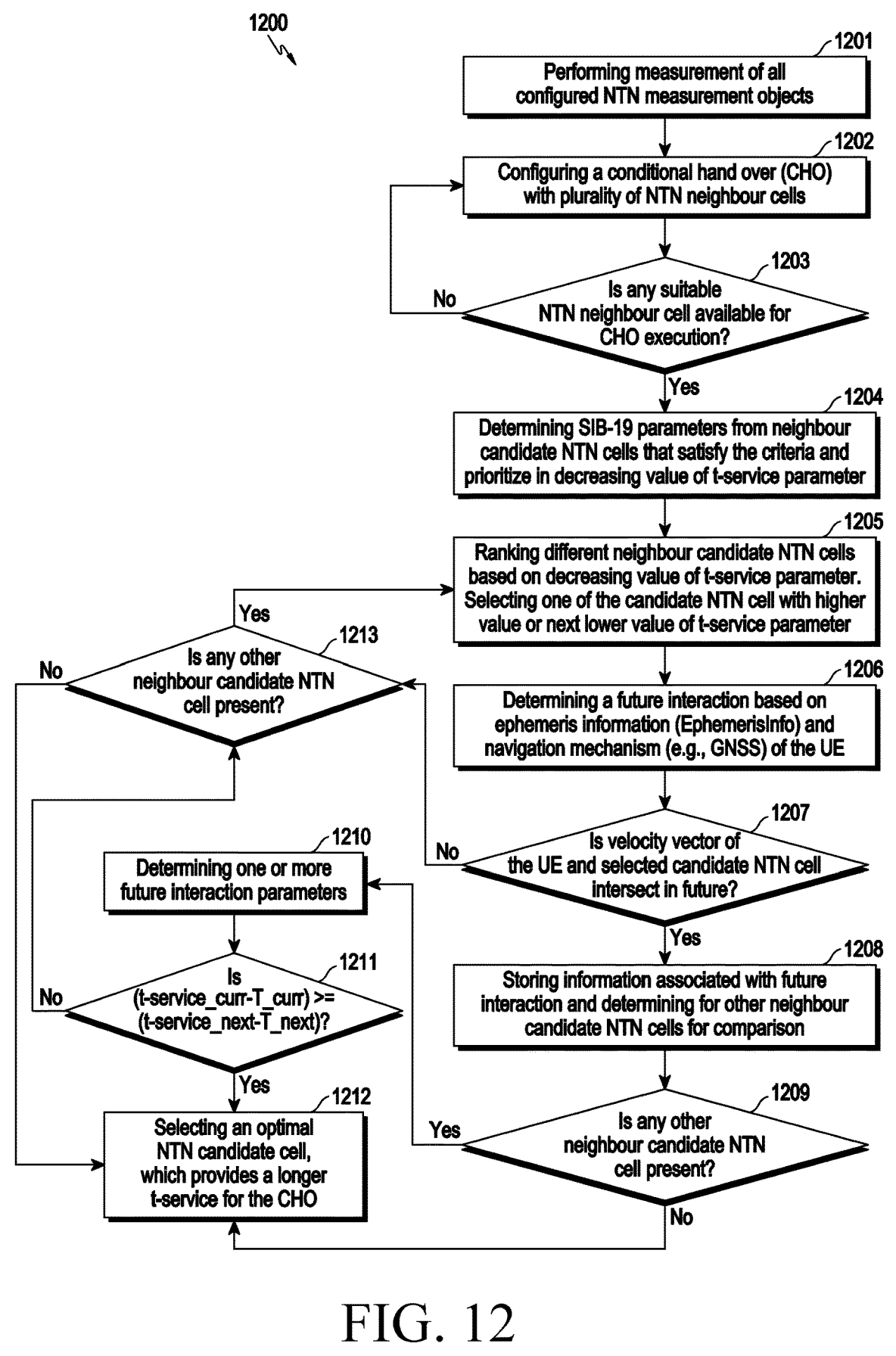

FIG. 12 is a flow diagram illustrating a method 1200 for selecting an optimal NTN cell among a plurality of NTN neighbor cells based on a service time duration and trajectory information, for a CHO according to an embodiment of the disclosure.

Referring to FIG. 12, at operation 1201, the method 1200 includes performing measurement of all configured NTN measurement objects (e.g., NTN neighbor cell). At operation 1202, the method 1200 includes configuring the CHO with the plurality of NTN neighbor cells 300. At operation 1203, the method 1200 includes determining whether any suitable NTN neighbor cell 300 is available for execution of the CHO. The method 1200 includes continuously monitoring the above-mentioned operations 1202 and 1203 in response to determining that the suitable NTN cell among the plurality of NTN neighbor cells 300 is not available for the CHO.

At operation 1204, the method 1200 includes determining the one or more SIB-19 parameters from the serving NTN cell 200 and/or the plurality of NTN neighbor cells 300 in response to determining that the suitable NTN cell among the plurality of NTN neighbor cells 300 is available for the CHO. The method 1200 further includes determining the availability of the service time duration associated with the one or more received SIB-19 parameters for the serving NTN cell 200 and the plurality of NTN neighbor cells 300 prior to expiration of the service time duration of the serving NTN cell 200. The method 1200 further includes determining the trajectory information associated with the UE 100 based on the navigation mechanism of the UE 100 and trajectory information associated with the plurality of NTN neighbor cells 300 based on the one or more received SIB-19 parameters. In one embodiment of the disclosure, the trajectory information is determined based on the position vector associated with the UE 100 and the velocity vector associated with the UE 100.

At operation 1205, the method 1200 includes ranking the availability of the service time duration associated with the plurality of NTN neighbor cells 300 in the descending order, where the first NTN neighbor cell (e.g., 300A) among the plurality of NTN neighbor cells 300 has the first service time duration that is highest among other service time durations of other NTN neighbor cells of the plurality of NTN neighbor cells 300, and/or, for next iteration, detecting the second service time duration associated with a second NTN neighbor cell (e.g., 300B) among the plurality of NTN neighbor cells 300, wherein the second service time duration is a next highest service time duration among other service time durations of other NTN neighbor cells of the plurality of NTN neighbor cells 300.

At operations 1206 and 1207, the method 1200 includes determining, based on the determined trajectory information associated with the first NTN neighbor cell (e.g., 300A) and the determined trajectory information associated with the UE 100, whether the future interaction occurs between the first NTN neighbor cell (e.g., 300A) and the UE 100. The method 1200 further includes determining whether any other NTN neighbor cell (e.g., 300B, 300C, . . . , 300N) is present in operation 1213 in response to determining that the future interaction does not occur between the first NTN neighbor cell (e.g., 300A) and the UE 100. The method 1200 further includes performing one or more operations 1205 to 1207 in response to determining that any other NTN neighbor cell (e.g., 300B, 300C, . . . , 300N) is present in operation 1213, otherwise, the UE (100) may select the optimal NTN cell as, for example, the first NTN neighbor cell (e.g., 300A) for the CHO in operation 1212. The above-mentioned operations may repeat for the next iteration associated with the second NTN neighbor cell (e.g., 300B), where the method 1200 includes determining, based on the determined trajectory information associated with the second NTN neighbor cell and the determined trajectory information associated with the UE 100, whether the future interaction occurs between the second NTN neighbor cell and the UE 100.

At operation 1208, the method 1200 includes storing, in response to determining that the future interaction occurs between the first NTN neighbor cell (e.g., 300A) and the UE 100, the future interaction occurs between the first NTN neighbor cell (e.g., 300A) and the UE 100 in the database associated with the UE 100. The above-mentioned operation may repeat for the next iteration associated with the second NTN neighbor cell (e.g., 300B), where the method 1200 includes storing, in response to determining that the future interaction occurs between the second NTN neighbor cell and the UE 100, the future interaction occurs between the second NTN neighbor cell and the UE 100 in the database associated with the UE 100.

At operation 1209, the method 1200 includes determining whether any other NTN neighbor cell (e.g., 300B, 300C, . . . , 300N) is present. The method 1200 includes selecting the optimal NTN cell as, for example, the first NTN neighbor cell (e.g., 300A) for the CHO in response to determining that any other NTN neighbor cell (e.g., 300B, 300C, . . . , 300N) is not present (1212). At operation 1210, the method 1200 includes determining, in response to determining that the future interaction occurs between the first NTN neighbor cell and the UE 100, one or more future interaction parameters associated with the first NTN neighbor cell, for example, as described in Table 12. The above-mentioned operations may repeat for the next iteration associated with the second NTN neighbor cell (e.g., 300B), where the method 1200 includes determining, in response to determining that the future interaction occurs between the second NTN neighbor cell (e.g., 300B) and the UE 100, one or more future interaction parameters associated with the first NTN neighbor cell and the second NTN neighbor.

At operations 1211 and 1212, the method 1200 includes selecting the optimal NTN cell among the plurality of NTN neighbor cells 300 based on the one or more determined future interaction parameters, which provides a longer t-service. In other words, the method 1200 includes determining whether the first difference value is greater than the second difference value. The UE 100 selects the optimal NTN cell (i.e., current iteration candidate cell) among the plurality of NTN neighbor cells 300 in response to determining that the first difference value is greater than the second difference value. Otherwise, the method 1200 includes performing one or more operations (e.g., 1213) for the next iteration candidate cell.

In the method 1200, the UE may prioritize the candidate NTN cell (e.g., first NTN neighbor cell 300A) with the highest t-service timer along its trajectory, preferring the CHO to the candidate NTN cell that provides service to the UE 100 for the longer duration than the next candidate NTN cell (e.g., second NTN neighbor cell 300B) and the UE 100 may require less frequent neighboring cell measurements by utilizing the one or more received the SIB-19 (e.g., t-Service, reference location, ephemerisInfo) and UE's instantaneous location (position vector) and direction (velocity vector) using the navigation mechanism of the UE 100, for example, global navigation satellite system (GNSS). As a result, the UE 100 consumes less power during the CHO.

Figure 13:
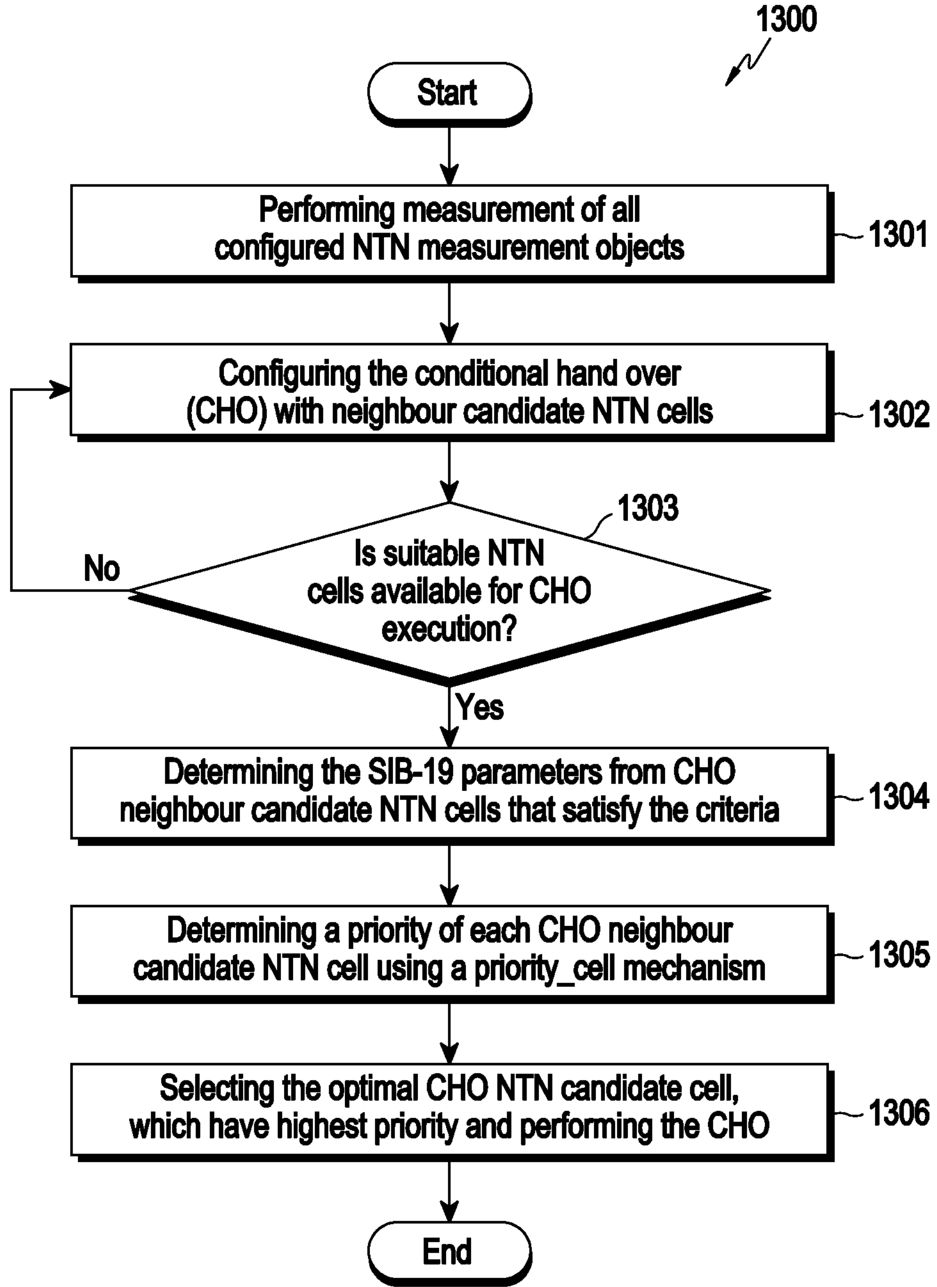
FIG. 13 is a flow diagram illustrating a method for selecting an optimal NTN cell among a plurality of NTN neighbor cells, based on weightage information, for a CHO, according to an embodiment of the disclosure.

FIG. 13 is a flow diagram illustrating a method 1300 for selecting an optimal NTN cell among a plurality of NTN neighbor cells, based on weightage information, for a CHO, according to an embodiment of the disclosure.

Referring to FIG. 13, at operation 1301, the method 1300 includes performing measurement of all configured NTN measurement objects (e.g., NTN neighbor cell), which relates to operation 1201 of FIG. 12. At operation 1302, the method 1300 includes configuring the CHO with the plurality of NTN neighbor cells 300, which relates to operation 1202 of FIG. 12. At operation 1303, the method 1300 includes determining whether any suitable NTN neighbor cell 300 is available for execution of the CHO, which relates to operation 1203 of FIG. 12. The method 1300 includes continuously monitoring the above-mentioned operations 1302 and 1303 in response to determining that the suitable NTN cell among the plurality of NTN neighbor cells 300 is not available for the CHO.

At operation 1304, the method 1300 includes determining the one or more SIB-19 parameters from the serving NTN cell 200 and/or the plurality of NTN neighbor cells 300 in response to determining that the suitable NTN cell among the plurality of NTN neighbor cells 300 is available for the CHO as per the 3GPP criteria, which relates to operation 1204 of FIG. 12. At operation 1305, the method 1300 includes determining a priority of each neighbor candidate NTN cell using the priority_cell mechanism, as described in equations.

In one or more embodiments of the disclosure, the method 1300 includes assigning the priority to all NTN neighbor cell (e.g., 300A, 300B, or the like) based on the above weightage Equation 2. The NTN neighbor cell which has the highest weightage may have the highest priority. The priority of the NTN neighbor cell may be arranged in the decreasing order.

At operation 1306, the method 1300 includes selecting, based on the determined priority (priority_cell), the optimal NTN cell among the plurality of NTN neighbor cells 300 to perform the CHO, where the optimal NTN cell has the highest priority. As a result, the UE 100 consumes less power during the CHO.

Figure 14:
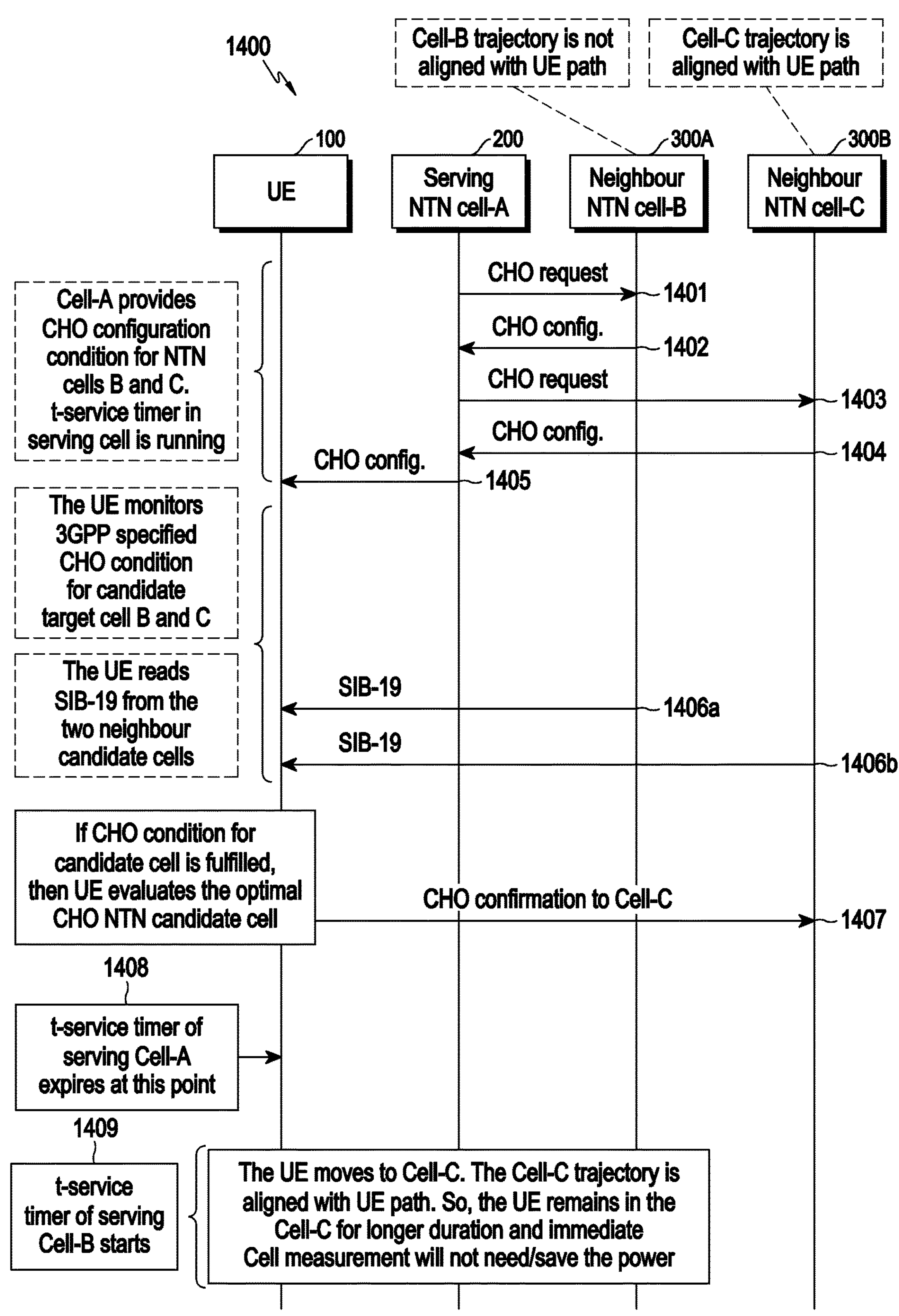
FIG. 14 is a sequence flow diagrams illustrating a method for a CHO, according to an embodiment of the disclosure.

FIG. 14 is a sequence flow diagrams illustrating a method 1400 for a CHO, according to an embodiment of the disclosure.

Referring to FIG. 14, at operation 1401, the method 1400 includes sending, by the serving NTN cell-A 200, a CHO request to the neighbor NTN cell-B 300A and initiating the t-service timer. At operation 1402, the method 1400 includes receiving, by the serving NTN cell-A 200, upon sending the CHO request, a CHO configuration from the neighbor NTN cell-B 300A. At operation 1403, the method 1400 includes sending, by the serving NTN cell-A, a CHO request to the neighbor NTN cell-C 300B. At operation 1404, the method 1400 includes receiving, by the serving NTN cell-A 200, upon sending the CHO request, a CHO configuration from the neighbor NTN cell-B 300A. At operation 1405, the method 1400 includes sending, by the serving NTN cell-A 200, the received CHO configuration associated with the neighbor NTN cell-B 300A and the neighbor NTN cell-C 300B to the UE 100.

At operations 1406*a* and 1406*b*, the method 1400 includes receiving the one or more SIB-19 parameters from the neighbor NTN cell-B 300A and the neighbor NTN cell-C 300B. At operation 1407, the method 1400 includes evaluating, by the UE 100, the optimal NTN cell among the plurality of NTN neighbor cells 300 by performing one or more operations, as described in conjunction with FIGS. 12, and 13, and as shown in Table 15.

TABLE 15

| NTN Cell Parameters | Cell-A | Cell-B | Cell-C |
|---|---|---|---|
| Signal condition (RSRP) | −100 dBm | −95 dBm | −97 dBm |
| T-Service (T_a < T_b < T_c) | T_a | T_b | T_c |
| Trajectory | Away from UE's trajectory | Away from UE's trajectory | Towards UE's trajectory |
| SIB19 validity duration | 5 sec | 5 sec | 10 sec |
| Future Intersection (based on EphemerisInfo) | False | False | True |
| Determined actual time duration going to be in Cell | Low | Low | High |

At operations 1407, 1408, and 1409, the method 1400 further includes performing, by the UE 100, the CHO to the neighbor NTN cell-C 300B based on the evolution by sending a CHO confirmation and before the t-service timer expiry, where the UE gets a higher duration of service (i.e., t-service). As a result, in the disclosed CHO method (1200 and 1300), the UE reselects the neighbor NTN cell-C 300B with higher service time and/or favorable trajectory with respect to the UE 100, which may lead to the lower frequency of neighbor cell measurements, causing less UE power consumption, which is desirable. Further, the disclosed CHO method (1200 and 1300) has several advantages over the existing CHO method (40, 50 and 60), which are described in Table 16.

TABLE 16

| Existing CHO method | Disclosed CHO method |
|---|---|
| The UE starts monitoring CHO conditions for candidate cells and without evaluating the future service duration in the different neighbor cells, UE performed CHO to Cell B based on the signal strength and distance threshold directly where UE will be in NTN service for a shorter duration. | The UE reads SIB-19 of different NTN neighbor cells and evaluates them based on their t-Service parameter, UE/Cell trajectory, SIB19 validity, and actual NTN service duration. |
| Although another cell (Cell C) was present which could have provided a better service duration, UE did not perform CHO to Cell C. | Based on SIB-19, the UE may determine that Cell C is more preferred for Conditional Handover since its trajectory is more aligned towards UE and UE will be in NTN service for a longer duration. |
| The existing CHO method does not take into consideration t-Service, UE/Cell trajectory, SIB19 validity, and actual NTN service duration of candidate cells due to which the optimal target cell minimizing frequent future neighbor cell measurements for NTN service continuity by UE cannot be ensured. | The disclosed CHO method ensures that the UE chooses optimal target cell for CHO leading to less frequent future neighbor cell measurements for NTN service continuity. |

Figure 15:
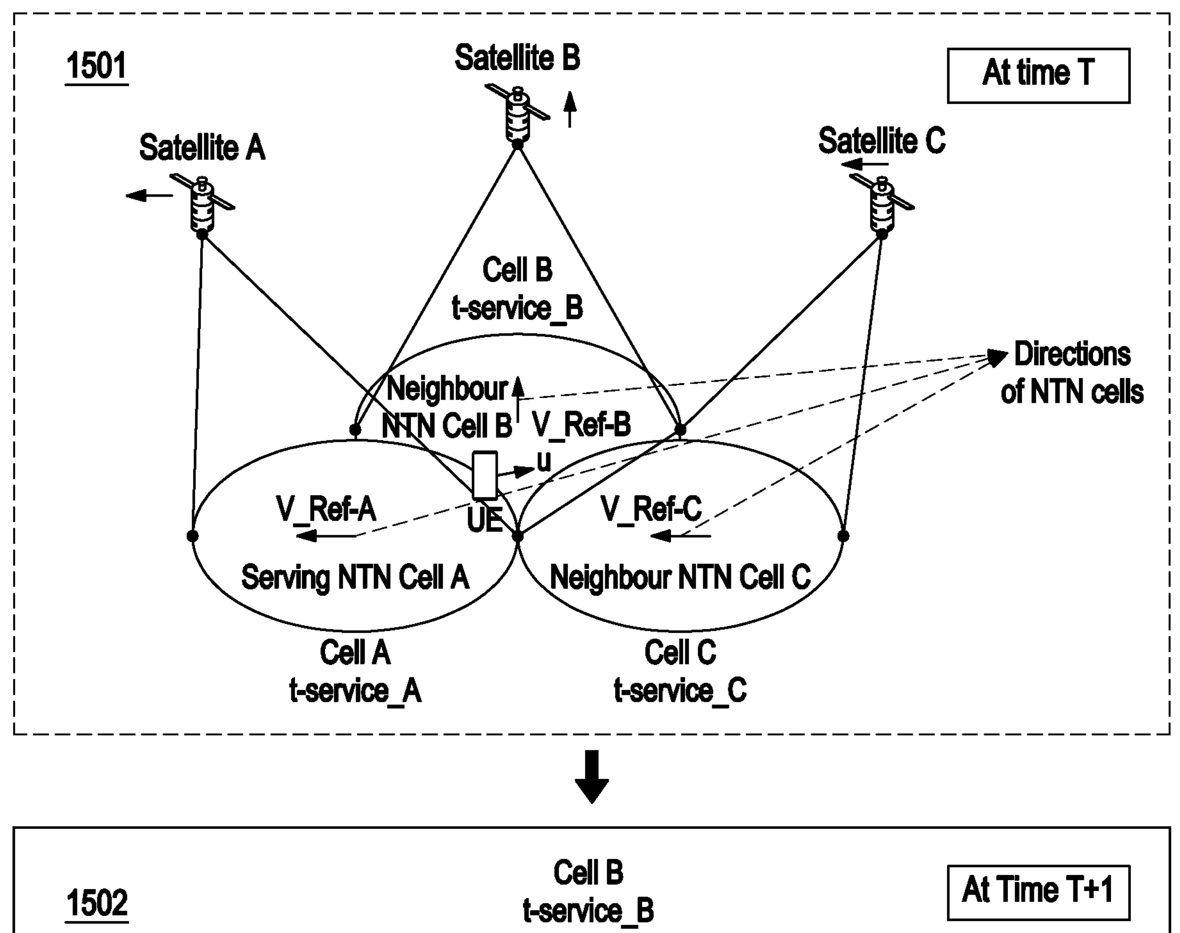
FIG. 15 illustrates a cell reselection and CHO in a NTN according to an embodiment of the disclosure.
Figure 15:
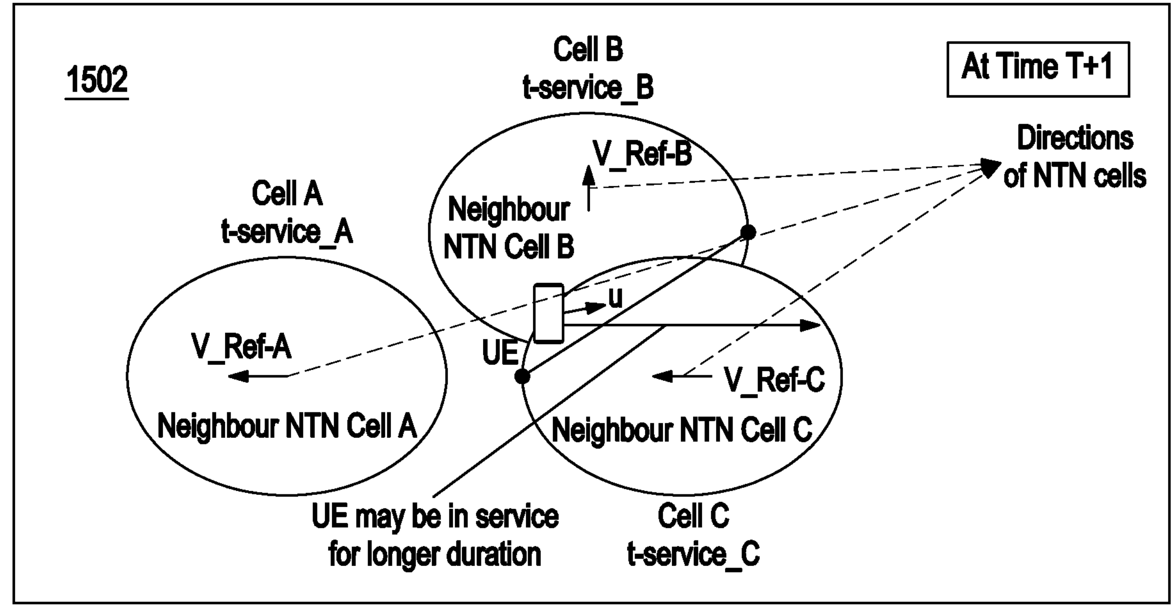

FIG. 15 illustrates a cell reselection and CHO in an NTN, according to an embodiment of the disclosure.

Referring to FIG. 15, in a first scenario 1501 at a first time period (e.g., t) and a second scenario 1502 at a second time period (e.g., t+1), t-service_A, t-service_B, and t-service_C represent timers set by the network in the SIB-19 for cell-A (e.g., the serving NTN cell-A 200), cell-B (e.g., the neighbor NTN cell-B 300A), and cell-C (e.g., the neighbor NTN cell-B 300B) of the NTN respectively. Further, V_Ref-A, V_Ref-B, and V_Ref-C are velocity vectors for satellite_A, satellite_B, and satellite_C of the NTN, each with different directions. Furthermore, "u" represents the velocity vector of the UE 100. The UE 100 is located in the cell-A, as illustrated in the first scenario 1501, where the t-service (i.e., t-service_A) was about to expire. Meanwhile, the UE 100 detects that the cell-B, and cell-C are candidate neighboring cells for the cell reselection or CHO. Value of the t-service for the cell-B is greater than the t-Service for the cell-C (t-service_B>t-service_C).

According to the above-mentioned disclosed method(s) (900, 1000, 1100, 1200, 1300, and 1400), the UE 100 may reselect another cell (e.g., cell-C) before the t-service_A timer expires to avoid losing network coverage, as illustrated in second scenario 1502. As a result, the UE 100 does not need to perform more frequent measurements of neighboring cells to maintain continuous service, causing less UE power consumption, which is desirable.

Figure 16:
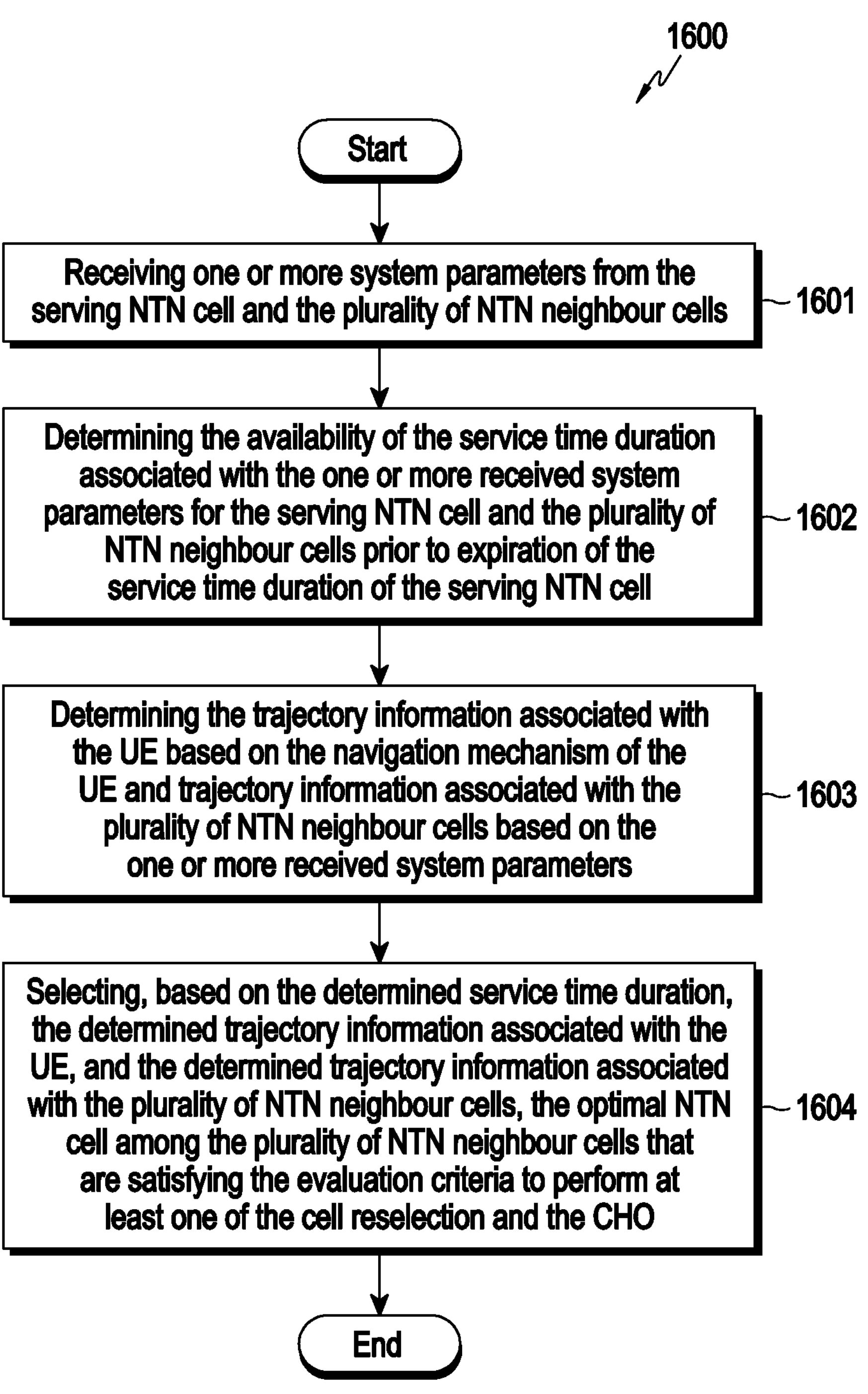
FIG. 16 is a flow diagram illustrating a method for selecting an optimal NTN cell among a plurality of NTN neighbor cells, based on a service time duration and trajectory information, for a cell reselection and/or CHO, according to an embodiment of the disclosure.

FIG. 16 is a flow diagram illustrating a method 1600 for selecting an optimal NTN cell among a plurality of NTN neighbor cells 300, based on a service time duration and trajectory information, for a cell reselection and/or CHO, according to an embodiment of the disclosure.

Referring to FIG. 16, at operation 1601, the method 1600 includes receiving the one or more system parameters from the serving NTN cell and the plurality of NTN neighbor cells 300. At operation 1602, the method 1600 includes determining the availability of the service time duration associated with the one or more received system parameters for the serving NTN cell 200 and the plurality of NTN neighbor cells 300. A service time duration for each of the plurality of NTN neighbor cells may be determined based on the received one or more system parameters. The service time duration for each of the plurality of NTN neighbor cells may be determined prior to expiration of the service time duration of the serving NTN cell 200. At operation 1603, the method 1600 includes determining the trajectory information associated with the UE 100 and trajectory information associated with the plurality of NTN neighbor cells 300 based on the one or more received system parameters. The trajectory information associated with the UE 100 may be determined based on a navigation mechanism (e.g. GPS information of the UE 100). At operation 1604, the method 1600 includes selecting, based on the determined service time duration, the determined trajectory information associated with the UE 100, and the determined trajectory information associated with the plurality of NTN neighbor cells 300, the NTN cell among the plurality of NTN neighbor cells 300 to perform at least one of the cell reselection and the CHO. The selected NTN cell may be an optimal NTN cell among a plurality of NTN neighbor cells that are satisfying the evaluation criteria.

Figure 17:
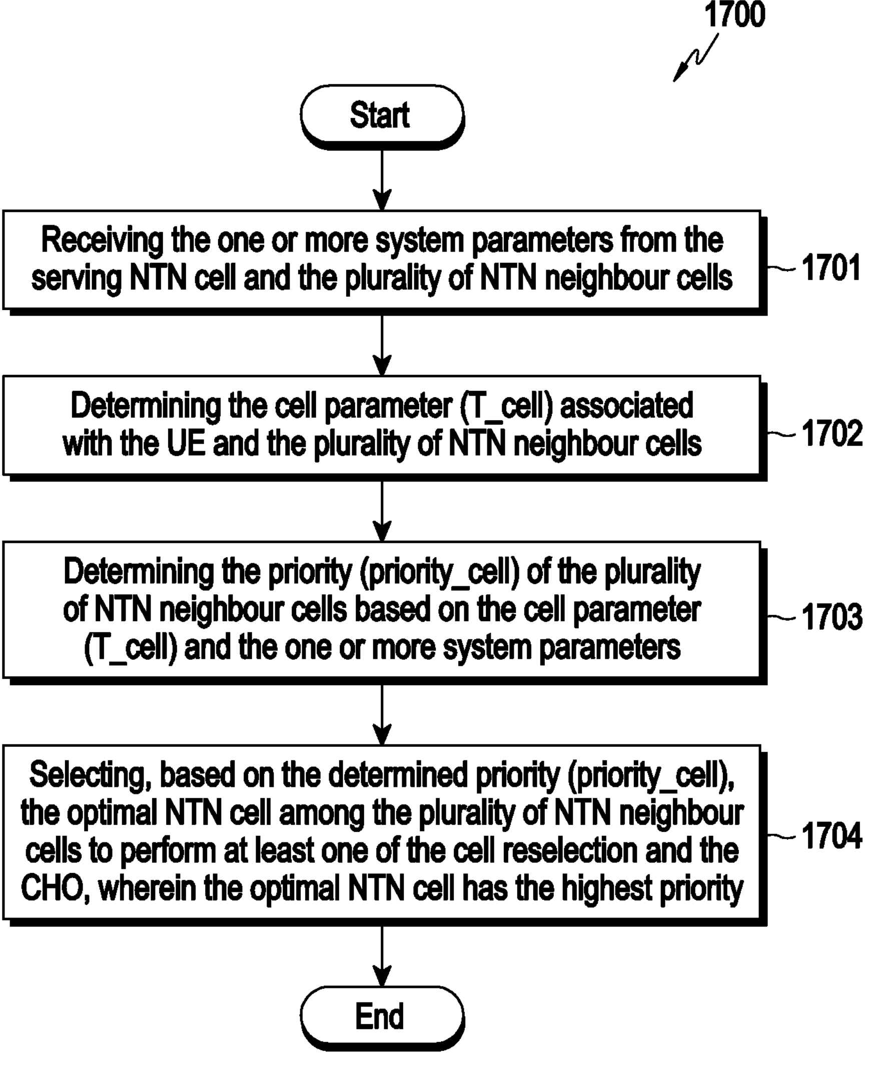
FIG. 17 is a flow diagram illustrating a method for selecting an optimal NTN cell among a plurality of NTN neighbor cells, based on weightage information, for a cell reselection and/or CHO, according to an embodiment of the disclosure.

FIG. 17 is a flow diagram illustrating a method 1700 for selecting an optimal NTN cell among a plurality of NTN neighbor cells 300, based on weightage information, for a cell reselection and/or CHO, according to an embodiment of the disclosure.

FIG. 17 is a flow diagram illustrating a method 1700 for selecting an optimal NTN cell among a plurality of NTN neighbor cells 300, based on weightage information, for a cell reselection and/or CHO, according to an embodiment of the disclosure.

Referring to FIG. 17, at operation 1701, the method 1700 includes receiving the one or more system parameters from the serving NTN cell 200 and the plurality of NTN neighbor cells 300. At operation 1702, the method 1700 includes determining the cell parameter associated with the UE 100 and the plurality of NTN neighbor cells 300. At operation 1703, the method 1700 includes determining the priority of the plurality of NTN neighbor cells 300 based on the cell parameter and the one or more system parameters. At operation 1704, the method 1700 includes selecting, based on the determined priority (priority_cell), the optimal NTN cell among the plurality of NTN neighbor cells 300 to perform at least one of the cell reselection and the CHO, wherein the optimal NTN cell has the highest priority.

The various actions, acts, blocks, operations, or the like in the flow diagrams may be performed in the order presented, in a different order, or simultaneously. Further, in some embodiments of the disclosure, some of the actions, acts, blocks, operations, or the like may be omitted, added, modified, skipped, or the like without departing from the scope of the disclosure.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and are scope of the disclosure as defined by the appended claims and their equivalents.

What is claimed is:

1. A method performed by a user equipment (UE) for selecting a non-terrestrial network (NTN) cell, the method comprising:

receiving one or more system parameters including ephemeris information from a serving NTN cell and a plurality of NTN neighbor cells;

determining trajectory information about the plurality of NTN neighbor cells based on the one or more received system parameters;

determining trajectory information about the UE based on global positioning system (GPS) information of the UE; and selecting the NTN cell among the plurality of NTN neighbor cells to perform at least one of a cell reselection or a conditional hand over (CHO), wherein the selected NTN cell is determined based on the determined trajectory information about the plurality of NTN neighbor cells, and the determined trajectory information about the UE.

2. The method of claim 1, further comprising:

determining a service time duration for each of the plurality of NTN neighbor cells-based on the one or more received system parameters, wherein the NTN cell among the plurality of NTN neighbor cells to perform at least one of the cell reselection or the CHO is selected further based on the determined service time duration for each of the plurality of NTN neighbor cells.

3. The method of claim 2, wherein the selecting of the NTN cell among the plurality of NTN neighbor cells comprises:

ranking the service time duration for each of the plurality of NTN neighbor cells in a descending order, wherein a first NTN neighbor cell among the plurality of NTN neighbor cells has a first service time duration that is highest among other service time durations of other NTN neighbor cells of the plurality of NTN neighbor cells;

determining, based on trajectory information about the first NTN neighbor cell and the determined trajectory information about the UE, whether a future interaction occurs between the first NTN neighbor cell and the UE;

storing, in response to determining that the future interaction occurs between the first NTN neighbor cell and the UE, information associated with the future interaction which occurs between the first NTN neighbor cell and the UE in a database associated with the UE;

determining, in response to determining that the future interaction occurs between the first NTN neighbor cell and the UE, one or more future interaction parameters associated with the first NTN neighbor cell; and selecting the NTN cell among the plurality of NTN neighbor cells based on the one or more determined future interaction parameters.

4. The method of claim 3, further comprising:

detecting a second service time duration associated with a second NTN neighbor cell among the plurality of NTN neighbor cells, wherein the second service time duration is a next highest service time duration among other service time durations of other NTN neighbor cells of the plurality of NTN neighbor cells;

determining, based on trajectory information about the second NTN neighbor cell and the determined trajectory information about the UE, whether a future interaction occurs between the second NTN neighbor cell and the UE;

storing, in response to determining that the future interaction occurs between the second NTN neighbor cell and the UE, information associated with the future interaction which occurs between the second NTN neighbor cell and the UE in the database associated with the UE;

determining, in response to determining that the future interaction occurs between the second NTN neighbor cell and the UE, one or more future interaction parameters associated with the first NTN neighbor cell and the second NTN neighbor; and selecting the NTN cell among the plurality of NTN neighbor cells based on the one or more determined future interaction parameters.

5. The method of claim 4, wherein the one or more determined future interaction parameters comprise at least one of a first service time value corresponding to the first NTN neighbor cell, a second service time value corresponding to the second NTN neighbor cell, a first-time value, a second-time value, a first difference value, or a second difference value.

6. The method of claim 5, wherein the first-time value represents an amount of time taken by the UE to reach at a first location associated with the first NTN neighbor cell, wherein the second-time value represents an amount of time taken by the UE to reach at a second location associated with the second NTN neighbor cell, wherein the first difference value indicates a difference between the first service time value for the first NTN neighbor cell and the first-time value, and wherein the second difference value indicates a difference between the second service time value for the second NTN neighbor cell and the second-time value.

7. The method of claim 1, wherein for determining the trajectory information about the UE, the method comprises:

determining a position vector associated with the UE;

determining a velocity vector associated with the UE; and determining the trajectory information about the UE based on the determined position vector and the determined velocity vector.

8. The method of claim 1, wherein the one or more system parameters further comprise at least one of a service time value, a distance threshold, an NTN configuration, a reference location, an NTN uplink synchronization validity duration timer, or a rate of change of signal condition.

9. The method of claim 1, further comprising:

determining, using the one or more system parameters, a service validity of a concerned satellite in the serving NTN cell and each of a position point and a trigger point for initiating at least one of an intra-frequency measurement or an inter-frequency measurement.

10. The method of claim 1, wherein the UE selects the NTN cell in at least one mode comprising a radio resource control (RRC) idle mode or an RRC connected mode.

11. A user equipment (UE) for selecting a non- terrestrial network (NTN) cell, the UE comprising:

a-memory, comprising one or more storage media, storing instructions;

a communicator including an electronic circuit; and at least one processor, operably connected to the memory and the communicator, wherein the instructions, when executed by the at least one processor individually or collectively, cause the UE to:

receive one or more system parameters including ephemeris information from a serving NTN cell and a plurality of NTN neighbor cells, determine trajectory information about the plurality of NTN neighbor cells based on the one or more received system parameters, determine trajectory information about the UE based on global positioning system (GPS) information of the UE; and select the NTN cell among the plurality of NTN neighbor cells to perform at least one of a cell reselection or a conditional hand over (CHO), wherein the selected NTN cell is determined based on the determined trajectory information about the plurality of NTN neighbor cells, and the determined trajectory information about the UE.

12. The UE of claim 11, wherein the instructions, when executed by the at least one processor individually or collectively, further cause the UE to:

determine a service time duration for each of the plurality of NTN neighbor cells based on the one or more received system parameters, wherein the NTN cell among the plurality of NTN neighbor cells to perform at least one of the cell reselection or the CHO is selected further based on the determined service time duration for each of the plurality of NTN neighbor cells.

13. The UE of claim 12, wherein, in selecting the NTN cell among the plurality of NTN neighbor cells, the instructions, when executed by the at least one processor individually or collectively, further cause the UE to:

rank the service time duration for each of the plurality of NTN neighbor cells in a descending order, wherein a first NTN neighbor cell among the plurality of NTN neighbor cells has a first service time duration that is highest among other service time durations of other NTN neighbor cells of the plurality of NTN neighbor cells, determine, based on trajectory information about the first NTN neighbor cell and the determined trajectory information about the UE, whether a future interaction occurs between the first NTN neighbor cell and the UE, store, in response to determining that the future interaction occurs between the first NTN neighbor cell and the UE, information associated with the future interaction which occurs between the first NTN neighbor cell and the UE in a database associated with the UE, determine, in response to determining that the future interaction occurs between the first NTN neighbor cell and the UE, one or more future interaction parameters associated with the first NTN neighbor cell, and select the NTN cell among the plurality of NTN neighbor cells based on the one or more determined future interaction parameters.

14. The UE of claim 13, wherein the instructions, when executed by the at least one processor individually or collectively, further cause the UE to:

detect a second service time duration associated with a second NTN neighbor cell among the plurality of NTN neighbor cells, wherein the second service time duration is a next highest service time duration among other service time durations of other NTN neighbor cells of the plurality of NTN neighbor cells, determine, based on trajectory information about the second NTN neighbor cell and the determined trajectory information about the UE, whether a future interaction occurs between the second NTN neighbor cell and the UE, store, in response to determining that the future interaction occurs between the second NTN neighbor cell and the UE, information associated with the future interaction which occurs between the second NTN neighbor cell and the UE in the database associated with the UE, determine, in response to determining that the future interaction occurs between the second NTN neighbor cell and the UE, one or more future interaction parameters associated with the first NTN neighbor cell and the second NTN neighbor, and select the NTN cell among the plurality of NTN neighbor cells based on the one or more determined future interaction parameters.

15. The UE of claim 14, wherein the one or more determined future interaction parameters comprise at least one of a first service time value corresponding to the first NTN neighbor cell, a second service time value corresponding to the second NTN neighbor cell, a first-time value, a second-time value, a first difference value, or a second difference value.

16. The UE of claim 15, wherein the first-time value represents an amount of time taken by the UE to reach at a first location associated with the first NTN neighbor cell, wherein the second-time value represents an amount of time taken by the UE to reach at a second location associated with the second NTN neighbor cell, wherein the first difference value indicates a difference between the first service time value for the first NTN neighbor cell and the first-time value, and wherein the second difference value indicates a difference between the second service time value for the second NTN neighbor cell and the second-time value.

17. The UE of claim 11, wherein, in determining the trajectory information about the UE, the instructions, when executed by the at least one processor individually or collectively, further cause the UE to:

determine a position vector associated with the UE;

determine a velocity vector associated with the UE; and determine the trajectory information about the UE based on the determined position vector and the determined velocity vector.

18. The UE of claim 11, wherein the one or more system parameters further comprise at least one of a service time value, a distance threshold, an NTN configuration, a reference location, an NTN uplink synchronization validity duration timer, or a rate of change of signal condition.

19. The UE of claim 11, wherein the instructions, when executed by the at least one processor individually or collectively, further cause the UE to:

determine, using the one or more system parameters, a service validity of a concerned satellite in the serving NTN cell and each of a position point and a trigger point for initiating at least one of an intra-frequency measurement or an inter-frequency measurement.

20. One or more non-transitory computer readable storage media storing one or more computer programs including computer-executable instructions that, when executed by one or more processors of a user equipment (UE) individually or collectively, cause the UE to perform operations, the operations comprising:

receiving one or more system parameters including ephemeris information from a serving NTN cell and a plurality of NTN neighbor cells;

determining trajectory information about the plurality of NTN neighbor cells based on the one or more received system parameters;

determining trajectory information about the UE based on global positioning system (GPS) information of the UE; and selecting the NTN cell among the plurality of NTN neighbor cells to perform at least one of a cell reselection or a conditional hand over (CHO), wherein the selected NTN cell is determined based on the determined trajectory information about the plurality of NTN neighbor cells, and the determined trajectory information about the UE.

* * * * *